US012454319B1

(12) United States Patent
Taylor et al.

(10) Patent No.: US 12,454,319 B1
(45) Date of Patent: Oct. 28, 2025

(54) VEHICLE WITH VENTED HOOD

(71) Applicant: Oshkosh Defense, LLC, Oshkosh, WI (US)

(72) Inventors: Jeff Taylor, Oshkosh, WI (US); Tim Booms, Oshkosh, WI (US); Jon Pandolfini, Oshkosh, WI (US)

(73) Assignee: OSHKOSH DEFENSE, LLC, Oshkosh, WI (US)

( * ) Notice: Subject to any disclaimer, the term of this patent is extended or adjusted under 35 U.S.C. 154(b) by 200 days.

(21) Appl. No.: 18/079,657

(22) Filed: Dec. 12, 2022

Related U.S. Application Data

(60) Provisional application No. 63/293,047, filed on Dec. 22, 2021.

(51) Int. Cl.
*B62D 25/12* (2006.01)
*B60K 11/08* (2006.01)

(52) U.S. Cl.
CPC .............. *B62D 25/12* (2013.01); *B60K 11/08* (2013.01)

(58) Field of Classification Search
CPC ................................ B60K 11/08; B62D 25/12
See application file for complete search history.

(56) References Cited

U.S. PATENT DOCUMENTS

| 4,325,283 A * | 4/1982 | Bemiss ................. B60K 11/00 89/36.02 |
| 2008/0284118 A1 | 11/2008 | Venton-Walters et al. |
| 2013/0074410 A1 * | 3/2013 | Berkeland ............. E02F 9/0866 49/142 |

* cited by examiner

*Primary Examiner* — Kevin A Lathers
(74) *Attorney, Agent, or Firm* — FOLEY & LARDNER LLP

(57) ABSTRACT

A vented hood assembly for a military vehicle includes a hood, a heat exchanger, and seals. The hood defines a hood volume, an inlet to the hood volume, and an outlet from the hood volume. The heat exchanger is positioned in the hood volume. The seals extend between sides of support members of the heat exchanger and the hood. The seals are configured to sealingly couple with the sides of the support members of the heat exchanger and corresponding surfaces of the hood. During transportation, air is driven to enter the hood volume through the inlet, pass through the heat exchanger, and exit the hood volume through the outlet to induce convective heat transfer from the heat exchanger into the air.

20 Claims, 29 Drawing Sheets

VEHICLE WITH VENTED HOOD

CROSS-REFERENCE TO RELATED PATENT APPLICATION

This application claims the benefit of and priority to U.S. Provisional Application No. 63/293,047, filed Dec. 22, 2021, the entire disclosure of which is incorporated by reference herein.

BACKGROUND

Military vehicles are often utilized in combat situations where the vehicles may be targeted with projectiles or explosives. As such, various components of the vehicles may be configured to be resistant to such damage.

SUMMARY

One implementation of the present disclosure is a vented hood assembly for a military vehicle, according to some embodiments. In some embodiments, the vented hood assembly includes a hood, a heat exchanger, and seals. In some embodiments, the hood defines a hood volume, an inlet to the hood volume, and an outlet from the hood volume. In some embodiments, the heat exchanger is positioned in the hood volume. In some embodiments, the seals extend between sides of support members of the heat exchanger and the hood. In some embodiments, the seals are configured to sealingly couple with the sides of the support members of the heat exchanger and corresponding surfaces of the hood. In some embodiments, during transportation, air is driven to enter the hood volume through the inlet, pass through the heat exchanger, and exit the hood volume through the outlet to induce convective heat transfer from the heat exchanger into the air.

In some embodiments, the vented hood assembly includes a grille. In some embodiments, the grille defines multiple openings as the inlet to the hood volume. In some embodiments, the grille is positioned in front of the heat exchanger.

In some embodiments, the vented hood assembly includes a vent disposed on a top of the hood. In some embodiments, the vent defines multiple openings as the outlet to an exterior of the vented hood assembly.

In some embodiments, the vented hood assembly includes a baffle disposed on the hood at a front of the vent. In some embodiments, the baffle extends into the hood volume in a downwards and rearwards direction. In some embodiments, the baffle is configured to limit entry of air from the exterior to the hood volume through the vent.

In some embodiments, the vented hood assembly includes a foam seal positioned on top of the heat exchanger between the heat exchanger and an interior surface of the hood. In some embodiments, the foam seal is configured to limit air from recirculating through the heat exchanger.

Another implementation of the present disclosure is a military vehicle, according to some embodiments. In some embodiments, the military vehicle includes a chassis and a hood assembly. In some embodiments, the hood assembly includes a hood, a heat exchanger, and multiple seals. In some embodiments, the hood defines a hood volume, an inlet to the hood volume, and an outlet from the hood volume. In some embodiments, the heat exchanger is positioned in the hood volume. In some embodiments, the seals extend between sides of support members of the heat exchanger and the hood. In some embodiments, the seals are configured to sealingly couple with the sides of the support members of the heat exchanger and corresponding surfaces of the hood. In some embodiments, during transportation, air is driven to enter the hood volume through the inlet, pass through the heat exchanger, and exit the hood volume through the outlet to induce convective heat transfer from the heat exchanger into the air.

In some embodiments, the hood assembly further includes a grille that defines multiple openings as the inlet to the hood volume and is positioned in front of the heat exchanger. In some embodiments, the hood assembly further includes a vent disposed on a top of the hood. In some embodiments, the vent defines multiple openings as the outlet to an exterior of the hood assembly.

In some embodiments, the hood assembly further includes a baffle disposed on the hood at a front of the vent. In some embodiments, the baffle extends into the hood volume in a downwards and rearwards direction. In some embodiments, the baffle is configured to limit entry of air from the exterior to the hood volume through the vent.

In some embodiments, the hood assembly further includes a foam seal positioned on top of the heat exchanger between the heat exchanger and an interior surface of the hood. In some embodiments, the foam seal is configured to limit air from recirculating through the heat exchanger. In some embodiments, as the military vehicle transports in a forwards direction, the hood assembly is configured to receive air from in front of the military vehicle through the inlet, and direct air through the outlet in a partially upwards direction.

Another implementation of the present disclosure is a hood assembly for a vehicle, according to some embodiments. In some embodiments, the hood assembly includes a hood, a heat exchanger, a grille, a vent, a baffle, multiple seals, and a foam seal. In some embodiments, the hood defines a hood volume. In some embodiments, the heat exchanger positioned in the hood volume. In some embodiments, the grille includes multiple opening. In some embodiments, the opening define an inlet to the hood volume from an exterior of the hood assembly. In some embodiments, the grille is positioned in front of the heat exchanger. In some embodiments, the vent is disposed on a top of the hood. In some embodiments, the vent defines an outlet of the hood volume to an exterior of the hood assembly. In some embodiments, the baffle is disposed on the hood at a front of the vent. In some embodiments, the baffle extends into the hood volume in a downwards and rearwards direction. In some embodiments, the seals extend between sides of support members of the heat exchanger and the hood. In some embodiments, the seals are configured to sealingly couple with the sides of the support members of the heat exchanger and corresponding surfaces of the hood. In some embodiments, the foam seal is positioned on top of the heat exchanger between the heat exchanger and an interior surface of the hood.

In some embodiments, during transportation, air is driven to enter the hood volume through the grille, pass through the heat exchanger, and exit the hood volume through the vent to induce convective heat transfer from the heat exchanger into the air. In some embodiments, the baffle is configured to limit entry of air from the exterior to the hood volume through the vent.

In some embodiments, the multiple seals are configured to limit air from passing around the heat exchanger. In some embodiments, the foam seal is configured to limit air from recirculating through the heat exchanger.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
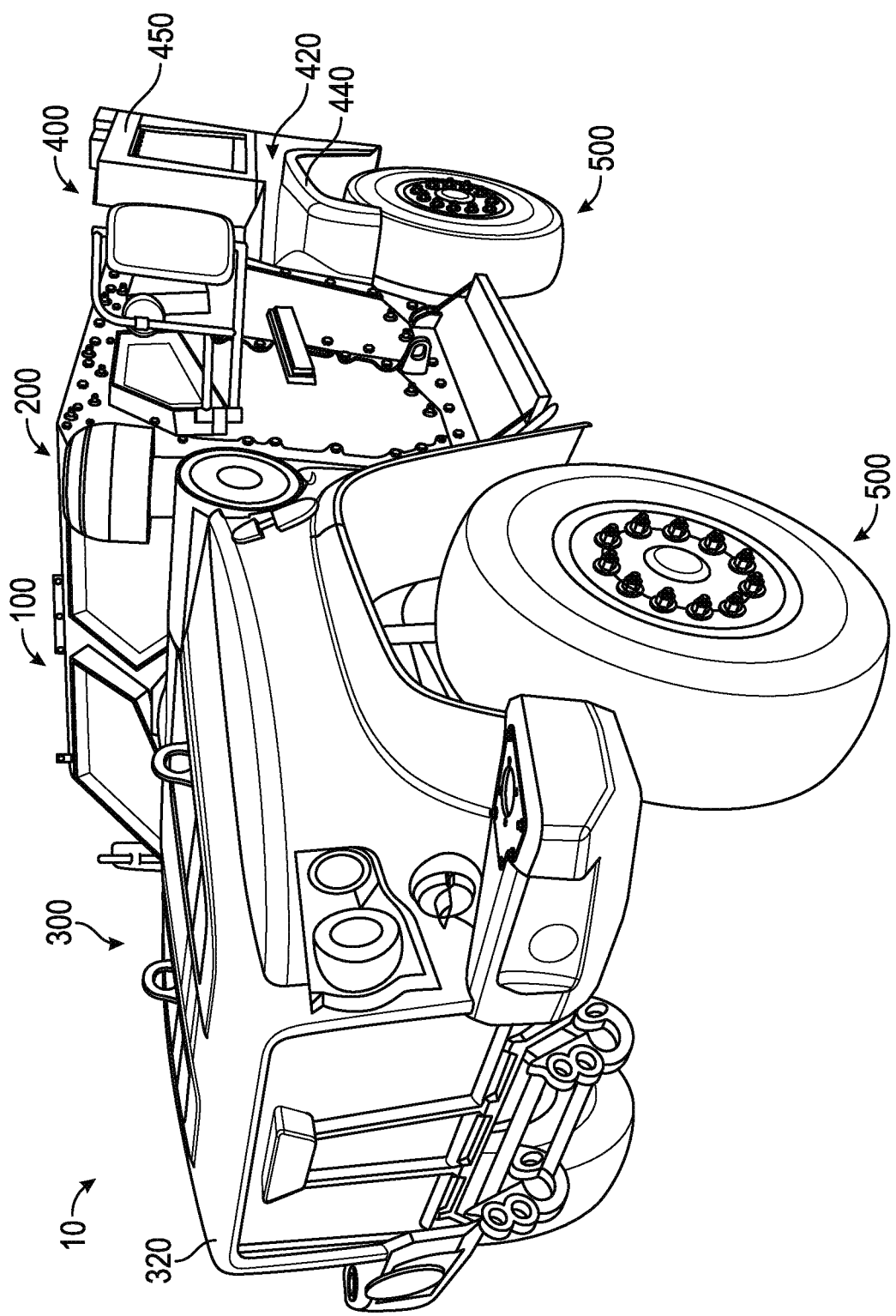
FIG. 1 is a front perspective view of a vehicle in an A-Kit configuration including a hood, according to an exemplary embodiment.
Figure 2:
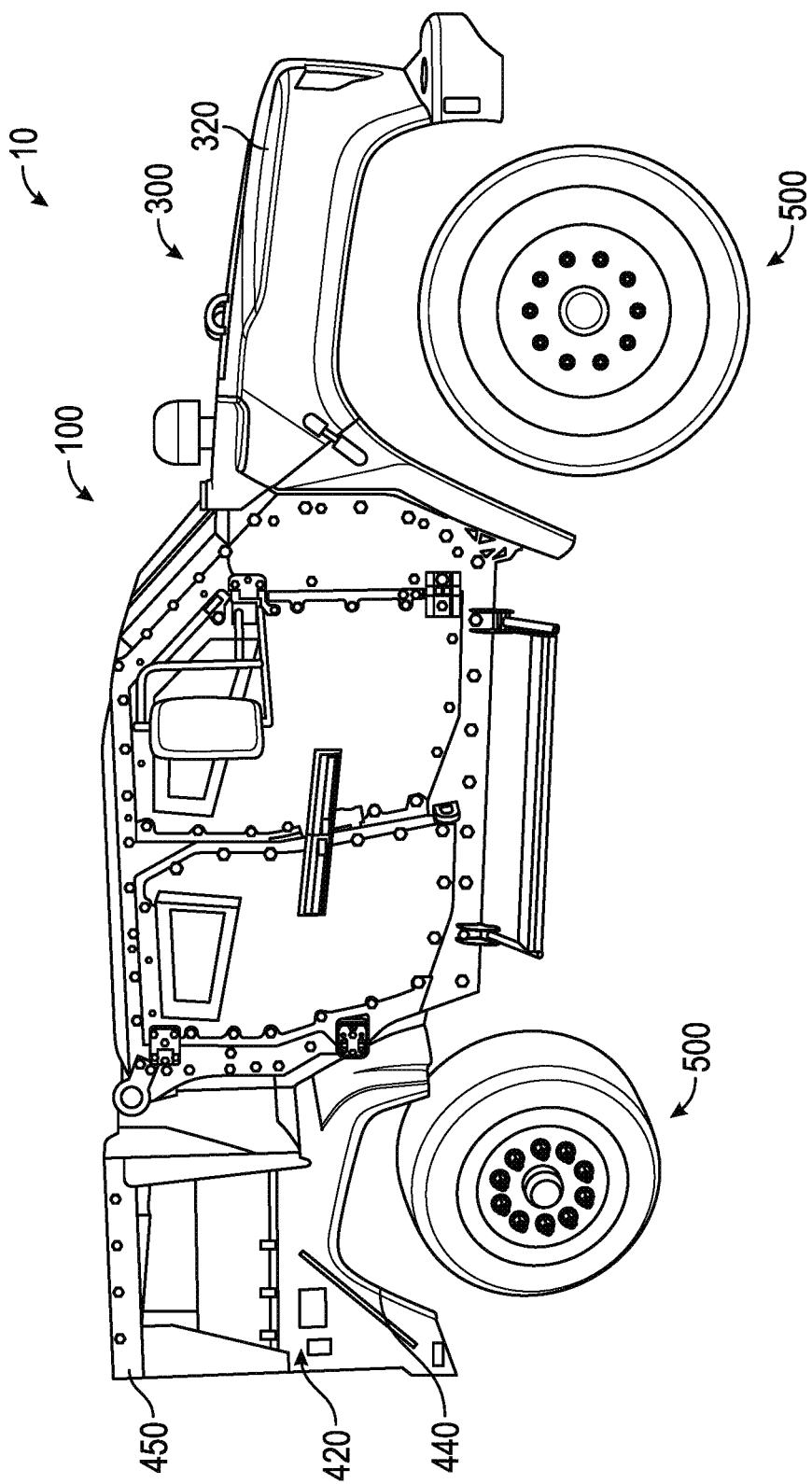
FIG. 2 is a side view of the vehicle of FIG. 1, according to an exemplary embodiment.
Figure 3:
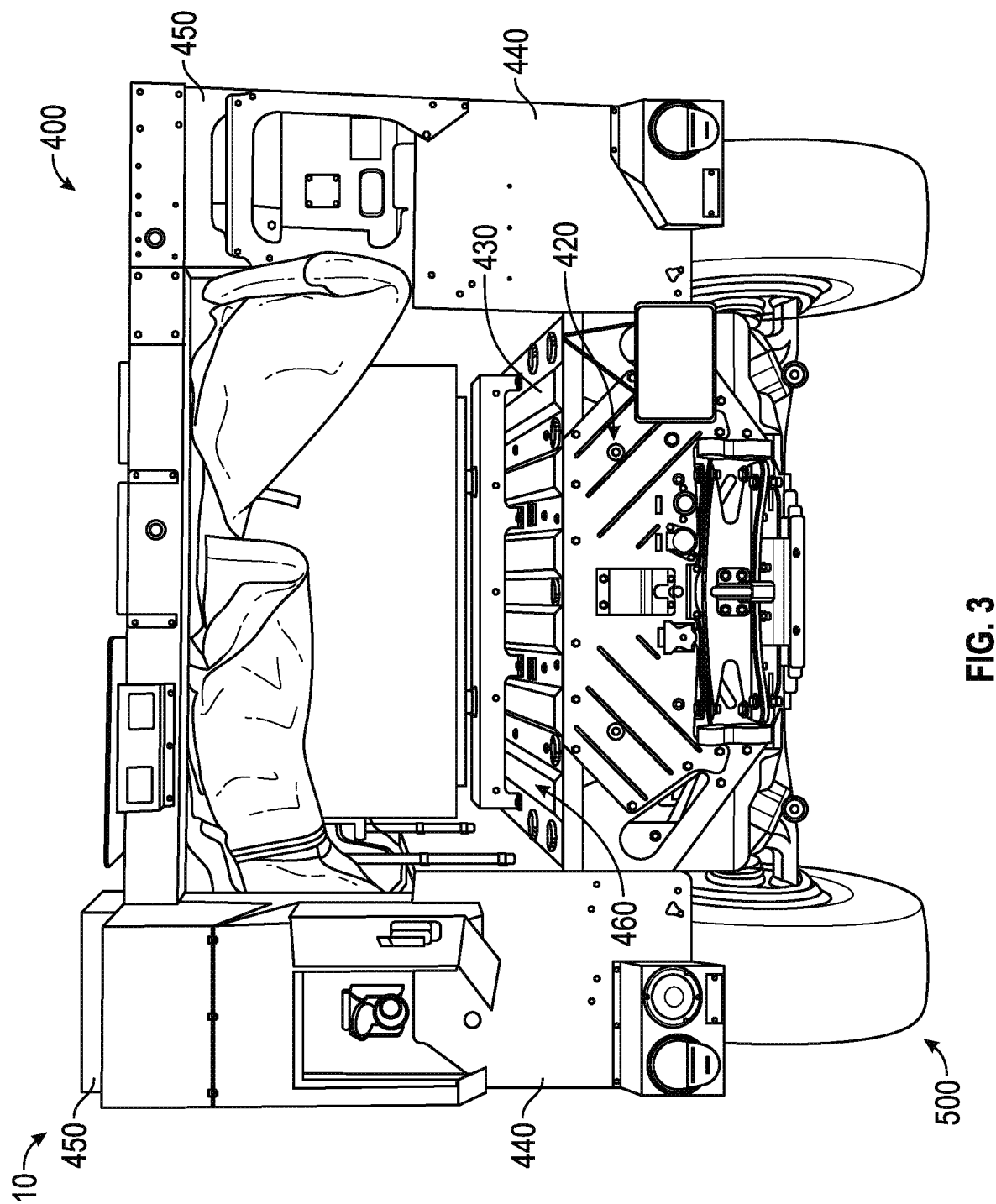
FIG. 3 is a rear view of the vehicle of FIG. 1, according to an exemplary embodiment.

According to the exemplary embodiment shown in FIGS. 1-3, a machine, shown vehicle 10, is configured as a military vehicle. In the embodiment shown, the military vehicle is a joint light tactical vehicle ("JLTV"). In other embodiments, the military vehicle is another type of military vehicle (e.g., a medium tactical vehicle, a heavy tactical vehicle, etc.). In an alternative embodiment, the vehicle 10 is another type of vehicle other than a military vehicle. For example, the vehicle 10 may be a fire apparatus (e.g., a pumper fire truck, a rear-mount aerial ladder truck, a mid-mount aerial ladder truck, a quint fire truck, a tiller fire truck, an airport rescue fire fighting ("ARFF") truck, etc.), a refuse truck, a concrete mixer truck, a tow truck, an ambulance, a farming machine or vehicle, a construction machine or vehicle, and/or still another vehicle.

As shown in FIGS. 1-9, the vehicle 10 includes a chassis assembly, shown as hull and frame assembly 100, including a passenger cabin, shown as passenger capsule 200, a first module, shown as front module 300, a second module, shown as rear module 400; a plurality of axle assemblies (e.g., including axles, differentials, wheels, brakes, suspension components, etc.), shown as axle assemblies 500, coupled to the front module 300 and the rear module 400; and a first electrified driveline arrangement (e.g., a powertrain, a drivetrain, including an accessory drive, etc.), shown as driveline 600.

According to an exemplary embodiment, the vehicle 10 is an armored vehicle (e.g., to be resistant to explosions or other impacts). In some embodiments, the passenger capsule 200 provides a robust and consistent level of protection by using overlaps to provide further protection at the door interfaces, component integration seams, and panel joints. The passenger capsule 200 may be manufactured from high hardness steel, commercially available aluminum alloys, ceramic-based SMART armor, and/or other suitable materials to provide a 360-degree modular protection system with two levels of underbody mine/improvised explosive device ("IED") protection. The modular protection system provides protection against kinetic energy projectiles and fragmentation produced by IEDs and overhead artillery fire. The two levels of underbody protection may be made of an aluminum alloy configured to provide an optimum combination of yield strength and material elongation. Each protection level uses an optimized thickness of this aluminum alloy to defeat underbody mine and IED threats.

According to an exemplary embodiment, the passenger capsule 200 is a structural shell that forms a monocoque hull structure. Monocoque refers to a form of vehicle construction in which the vehicle body and chassis form a single unit. In some embodiments, the passenger capsule 200 includes a plurality of integrated armor mounting points configured to engage a supplemental armor kit (e.g., a "B-Kit," etc.). According to the exemplary embodiment shown in FIGS. 1, 2, 4, 5, and 9, the passenger capsule 200 accommodates four passengers in a two-by-two seating arrangement and has four doors mounted thereto. According to the alternative embodiment shown in FIG. 8, the passenger capsule 200 accommodates two passengers and has two doors mounted thereto.

Figure 4:
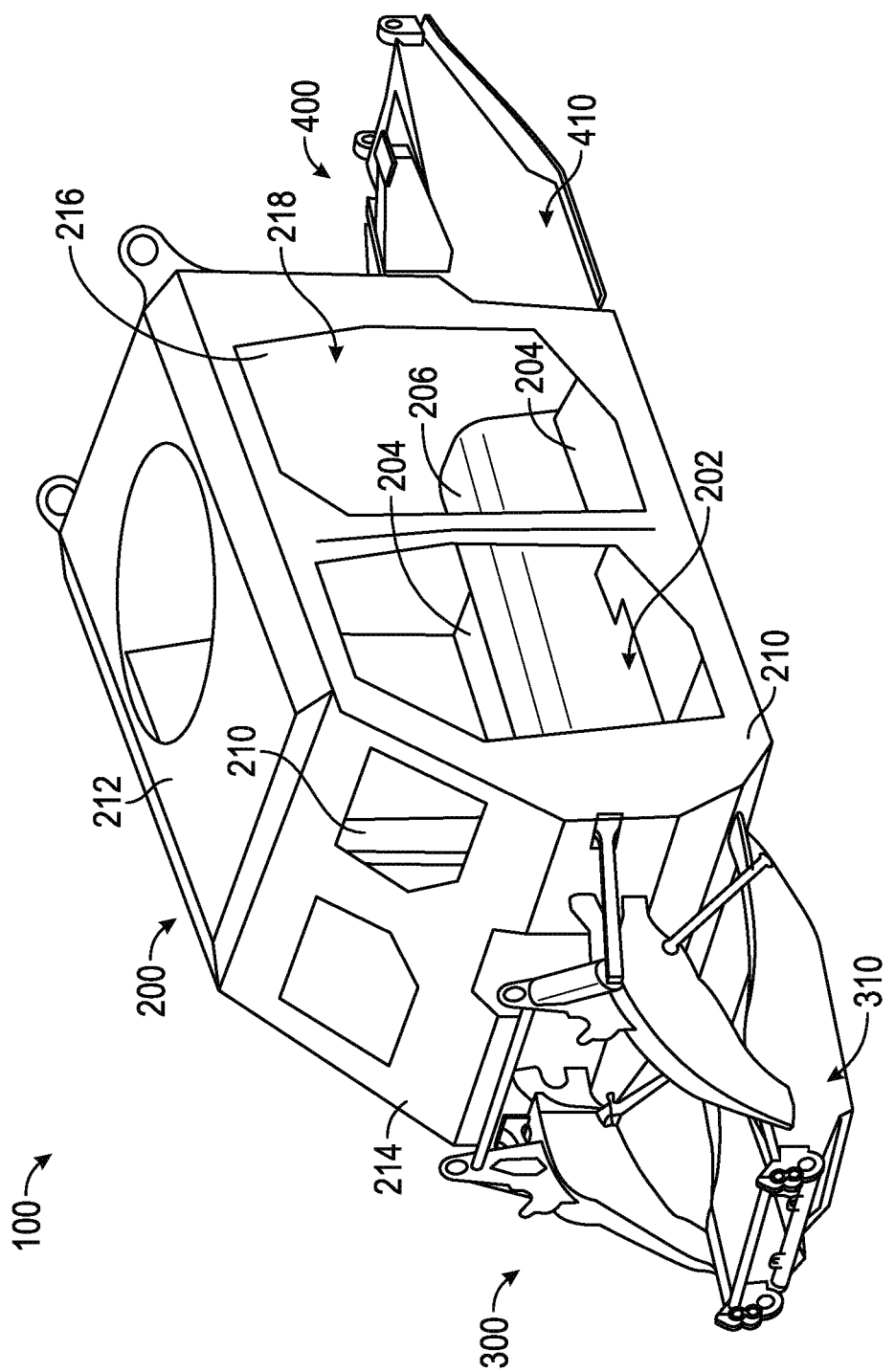
FIG. 4 is a perspective view of a chassis assembly of the vehicle of FIG. 1 including a passenger capsule, a front module, and a rear module, according to an exemplary embodiment.
Figure 5:
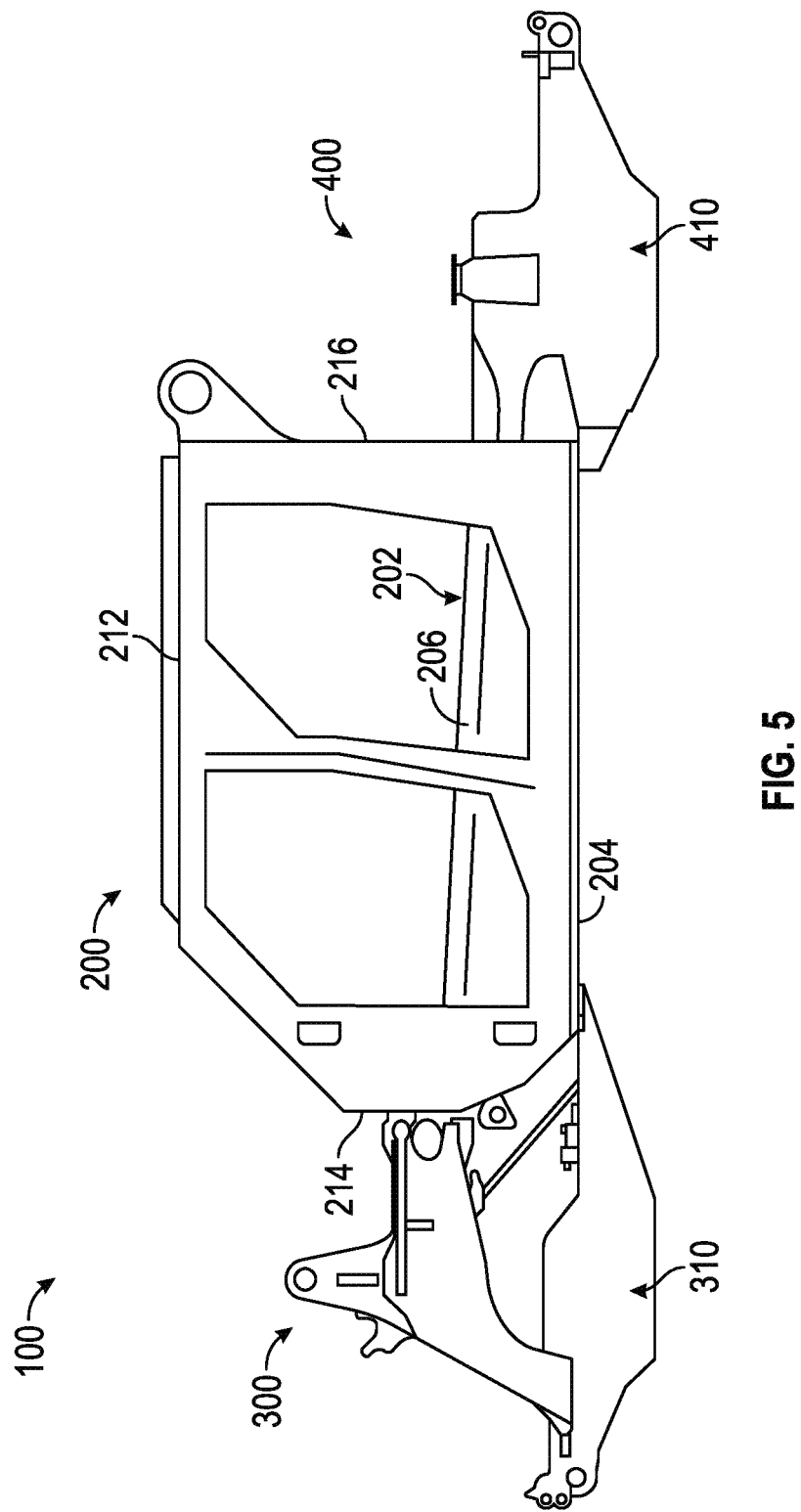
FIG. 5 is a side view of the chassis assembly of FIG. 4, according to an exemplary embodiment.
Figure 6:
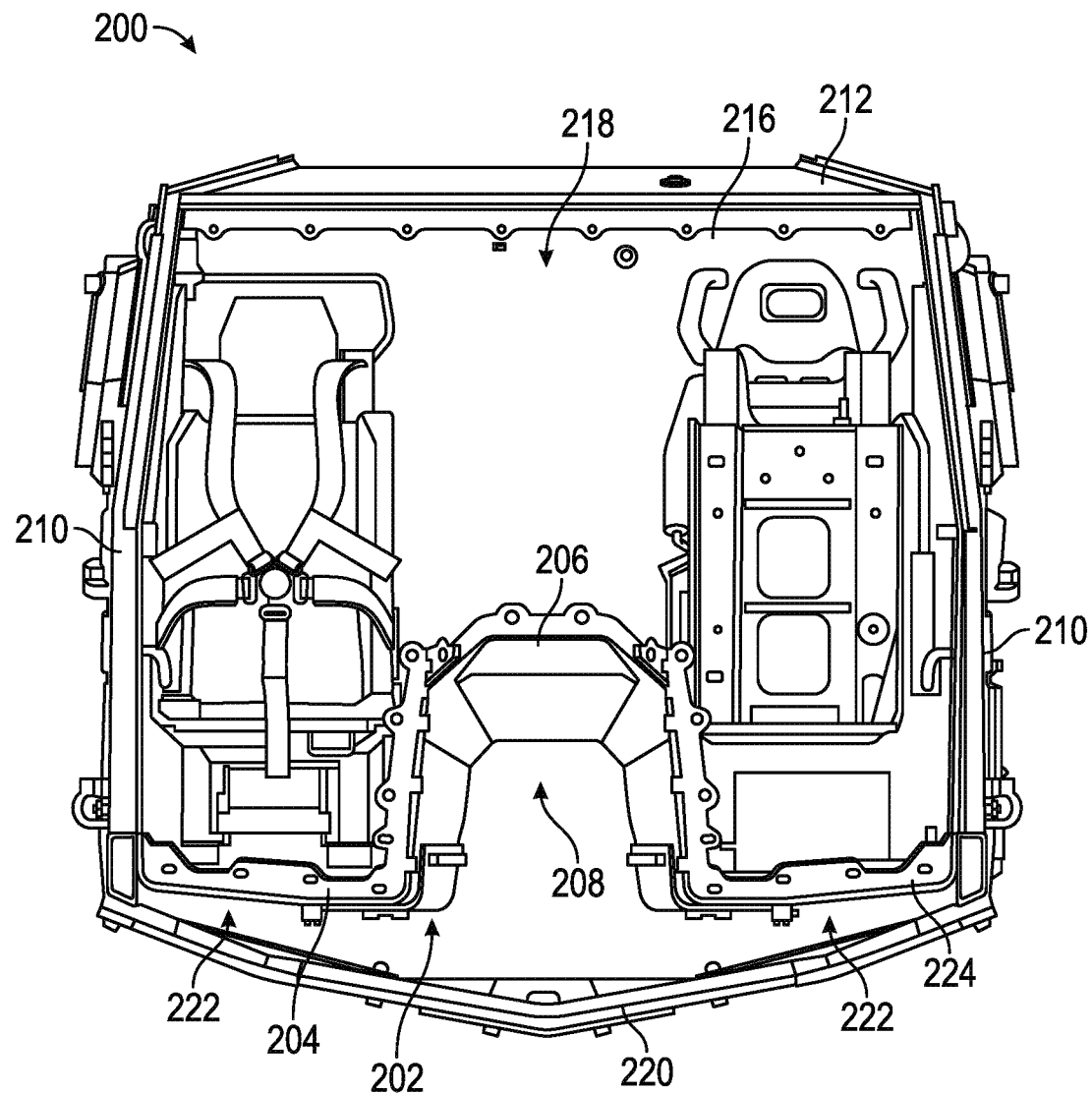
FIG. 6 is a cross-sectional view of the passenger capsule of FIG. 4, according to an exemplary embodiment.

As shown in FIGS. 4-6, the passenger capsule 200 includes a floor assembly, shown as floor assembly 202, having a pair of floor portions, shown as floor portions 204, laterally spaced apart and separated by a central tunnel, shown as structural tunnel 206, extending longitudinally along a centerline of the passenger capsule 200. According to an exemplary embodiment, for load purposes, the structural tunnel 206 replaces a frame or rail traditionally used in vehicle chassis. As shown in FIG. 6, the structural tunnel 206 (i) has an arcuately shaped cross-section that extends upward into an interior, shown as passenger compartment 218, of the passenger capsule 200 and (ii) defines a cavity or recessed space, shown as tunnel slot 208. The configuration of the structural tunnel 206 increases the distance between the ground and the passenger compartment 218 of the passenger capsule 200. Accordingly, the structural tunnel 206 may provide greater blast protection from IEDs located on the ground (e.g., because the IED has to travel a greater distance in order to penetrate the structural tunnel 206).

As shown in FIGS. 4-6, the passenger capsule 200 additionally includes a pair of side panels, shown as sidewalls 210, coupled to opposing lateral sides of the floor assembly 202; a top panel, shown as roof 212, coupled to the sidewalls 210 opposite the floor assembly 202; a front panel, shown as front wall 214, coupled to front ends of the floor assembly 202, the sidewalls 210, and the roof 212; and a rear panel, shown as rear wall 216, coupled to rear ends of the floor assembly 202, the sidewalls 210, and the roof 212. As shown in FIGS. 4 and 6, the floor assembly 202, the sidewalls 210, the roof 212, the front wall 214, and the rear wall 216 cooperatively define the passenger compartment 218.

As shown in FIG. 6, the passenger capsule 200 includes a belly deflector, shown as v-shaped belly deflector 220, coupled to bottom ends of the sidewalls 210 and across the bottom of the passenger capsule 200 beneath the floor assembly 202. According to an exemplary embodiment, the v-shaped belly deflector 220 is configured to mitigate and spread blast forces along the belly of the vehicle 10. As shown in FIG. 6, the v-shaped belly deflector 220 is spaced from the floor assembly 202 such that a space, shown as air gap 222, is formed between the floor portions 204 of the floor assembly 202 and the v-shaped belly deflector 220.

In some embodiments, the floor assembly 202, the sidewalls 210, the roof 212, the front wall 214, the rear wall 216, and the v-shaped belly deflector 220 are fabricated subassemblies that are bolted together to provide the passenger capsule 200. Such a modular approach to the passenger capsule 200 provides increased protection with the application of perimeter, roof, and underbody add on panels. The components of the passenger capsule 200 mitigate and attenuate blast effects, allow for upgrades, and facilitate maintenance and replacements.

As shown in FIGS. 4, 5, 7, 8, and 9, the front module 300 includes a first subframe assembly, shown as front subframe 310, and the rear module 400 includes a second subframe assembly, shown as rear subframe 410. The front subframe 310 includes a first plurality of frame members coupled to the floor assembly 202 and the front wall 214 of the passenger capsule 200 at a first plurality of interfaces. The rear subframe 410 includes a second plurality of frame members coupled to the floor assembly 202 and the rear wall 216 of the passenger capsule 200 at a second plurality of interfaces. Such interfaces may include, for example, a plurality of fasteners (e.g., bolts, rivets, etc.) extending through corresponding pads coupled to the front subframe 310, the rear subframe 410, and the passenger capsule 200. According to an exemplary embodiment, a front axle assembly of the axle assemblies 500 is coupled to the front subframe 310 and a rear axle assembly of the axle assemblies 500 is coupled to the rear subframe 410.

The front subframe 310 and the rear subframe 410 may be manufactured from high strength steels, high strength aluminum, or another suitable material. According to an exemplary embodiment, the front subframe 310 and the rear subframe 410 feature a tabbed, laser cut, bent, and welded design. In other embodiments, the front subframe 310 and the rear subframe 410 are manufactured from tubular members to form a space frame. The front subframe 310 and the rear subframe 410 may also include forged frame sections, rather than fabricated or cast frame sections, to mitigate the stress, strains, and impact loading imparted during operation of the vehicle 10. Aluminum castings may be used for various cross member components where the loading is compatible with such material properties.

The passenger capsule 200, the front subframe 310, and the rear subframe 410 are integrated into the hull and frame assembly 100 to efficiently carry chassis loading imparted during operation of the vehicle 10, during a lift event, during a blast event, or under still other conditions. During a blast event, conventional frame rails can capture the blast force, transferring the blast force into the vehicle 10 and the occupants thereof. The vehicle 10 replaces conventional frame rails and instead includes the passenger capsule 200, the front module 300, and the rear module 400. According to an exemplary embodiment, the passenger capsule 200, the front module 300, and the rear module 400 vent blast gases (e.g., traveling upward after a tire triggers an IED), thereby reducing the blast force on the passenger capsule 200 and the occupants within passenger capsule 200. Traditional frame rails may also directly impact (e.g., contact, engage, hit, etc.) the floor of traditional military vehicles. The hull and frame assembly 100 does not include traditional frame rails extending along a length of the vehicle 10, thereby eliminating the ability for such frame rails to impact the floor assembly 202 of the passenger capsule 200.

As shown in FIGS. 1-3, the rear module 400 includes a body assembly, shown as cargo body assembly 420, supported by the rear subframe 410. The cargo body assembly 420 includes a deck, shown as bed 430; a pair of wheel wells, shown as wheel wells 440, positioned along opposing lateral sides of the bed 430 and over the wheels of the rear axle assembly of the axle assemblies 500; and a pair of storage compartments, shown as stowage boxes 450, positioned along and on top of the wheel wells 440. As shown in FIG. 3, the bed 430, the wheel wells 440, and the stowage boxes 450 cooperatively define a compartment, shown as bed cavity 460.

Figure 7:
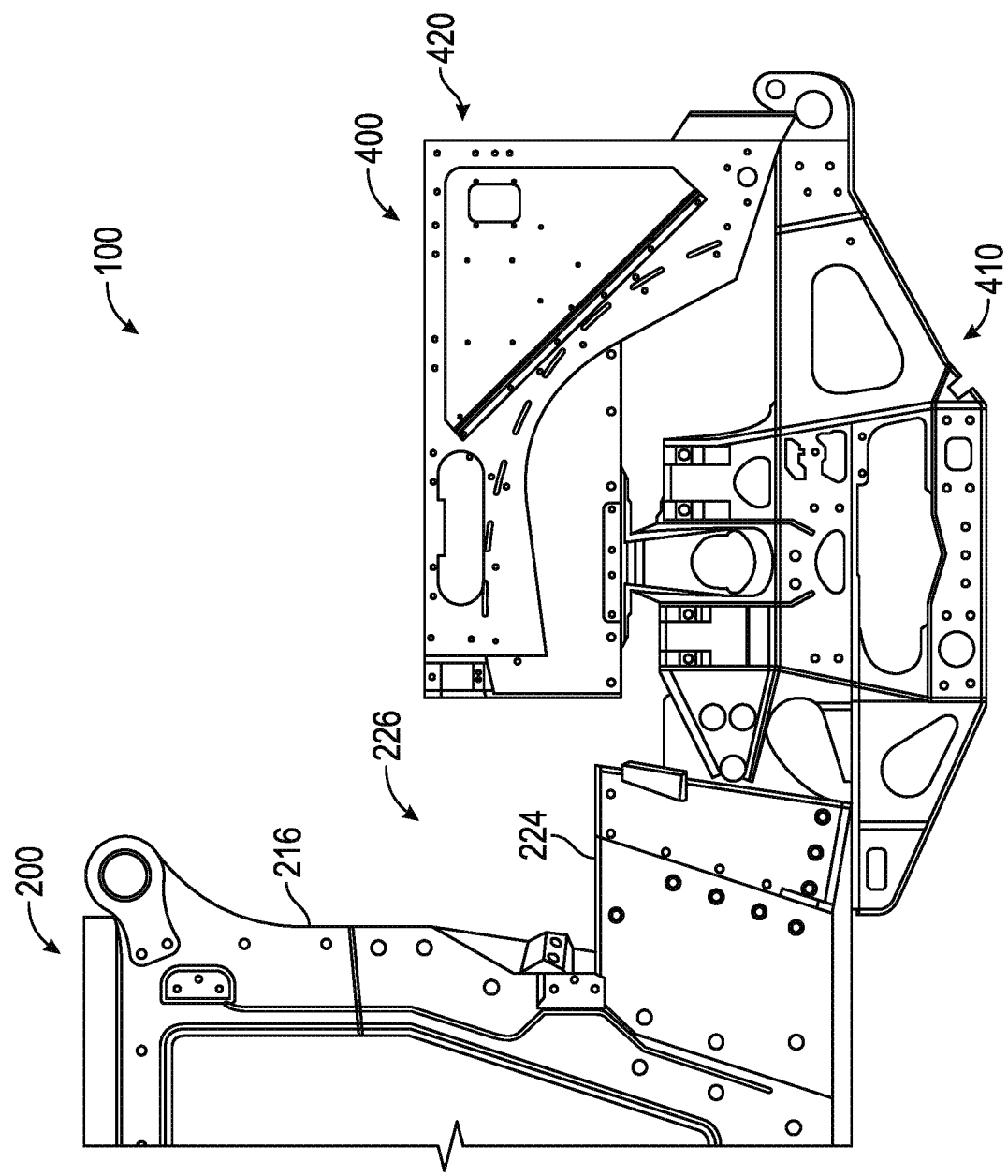
FIG. 7 is a detailed side view of a chassis assembly of the vehicle of FIG. 1, according to another exemplary embodiment.
Figure 8:
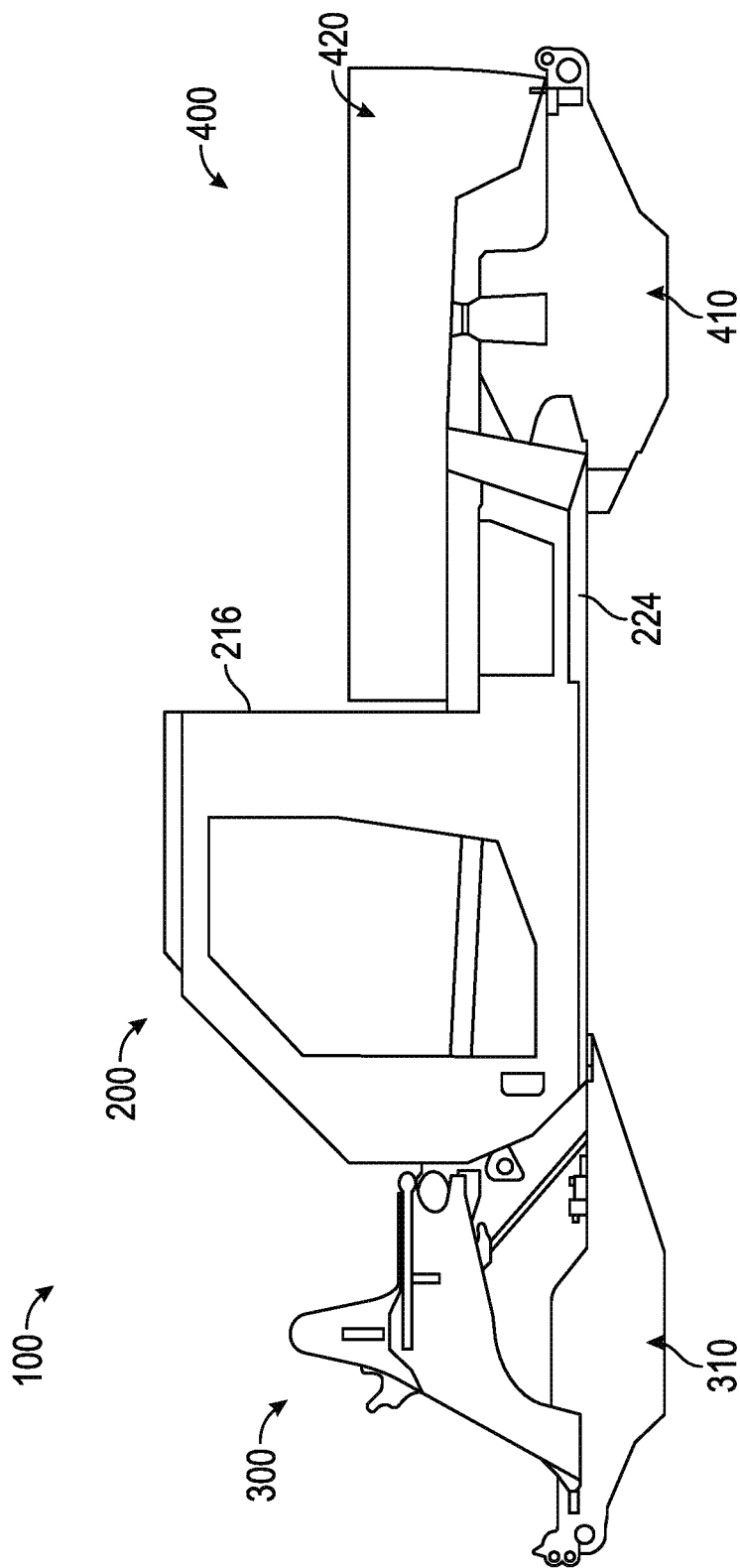
FIG. 8 is a side view of a chassis assembly of the vehicle of FIG. 1, according to another exemplary embodiment.

In some embodiment, as shown in FIG. 7, the passenger capsule 200 includes a protrusion, shown as capsule extension 224, extending from a bottom portion of the rear wall 216 of the passenger capsule 200. According to an exemplary embodiment, the capsule extension 224 provides an extended wheelbase for the vehicle 10, which facilitates providing a cavity, shown as gap 226, between the rear wall 216 and the cargo body assembly 420 of the rear module 400. In some embodiments, as shown in FIG. 8, the capsule extension 224 replaces a rear portion (e.g., back seats, etc.) of the passenger capsule 200 and supports an extended cargo body assembly 420 (e.g., eliminating the gap 226 of FIG. 7 or maintaining the gap 226 of FIG. 7).

Figure 9:
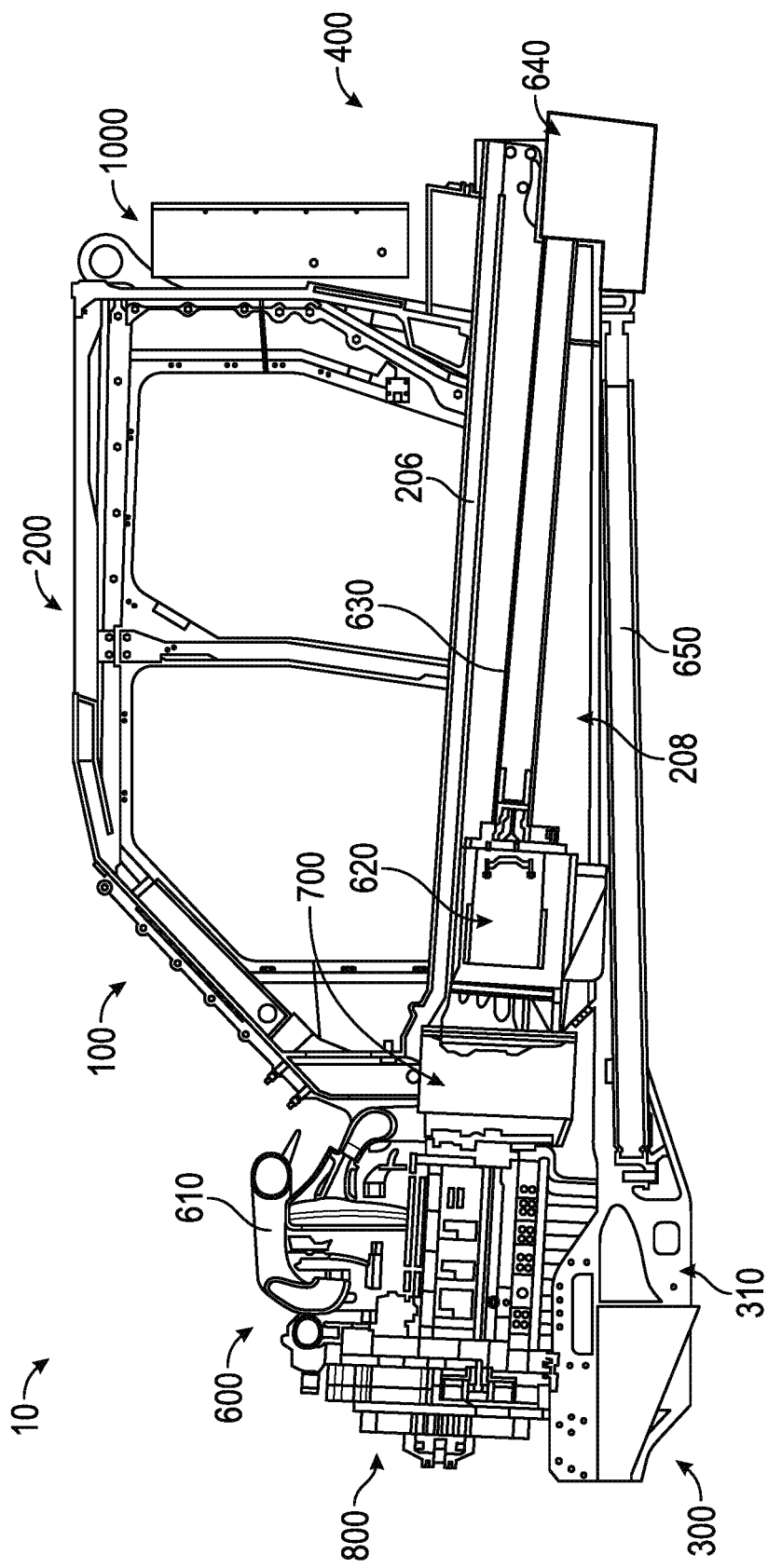
FIG. 9 is a cross-sectional side view of the vehicle of FIG. 1 including a driveline, according to an exemplary embodiment.
Figure 10:
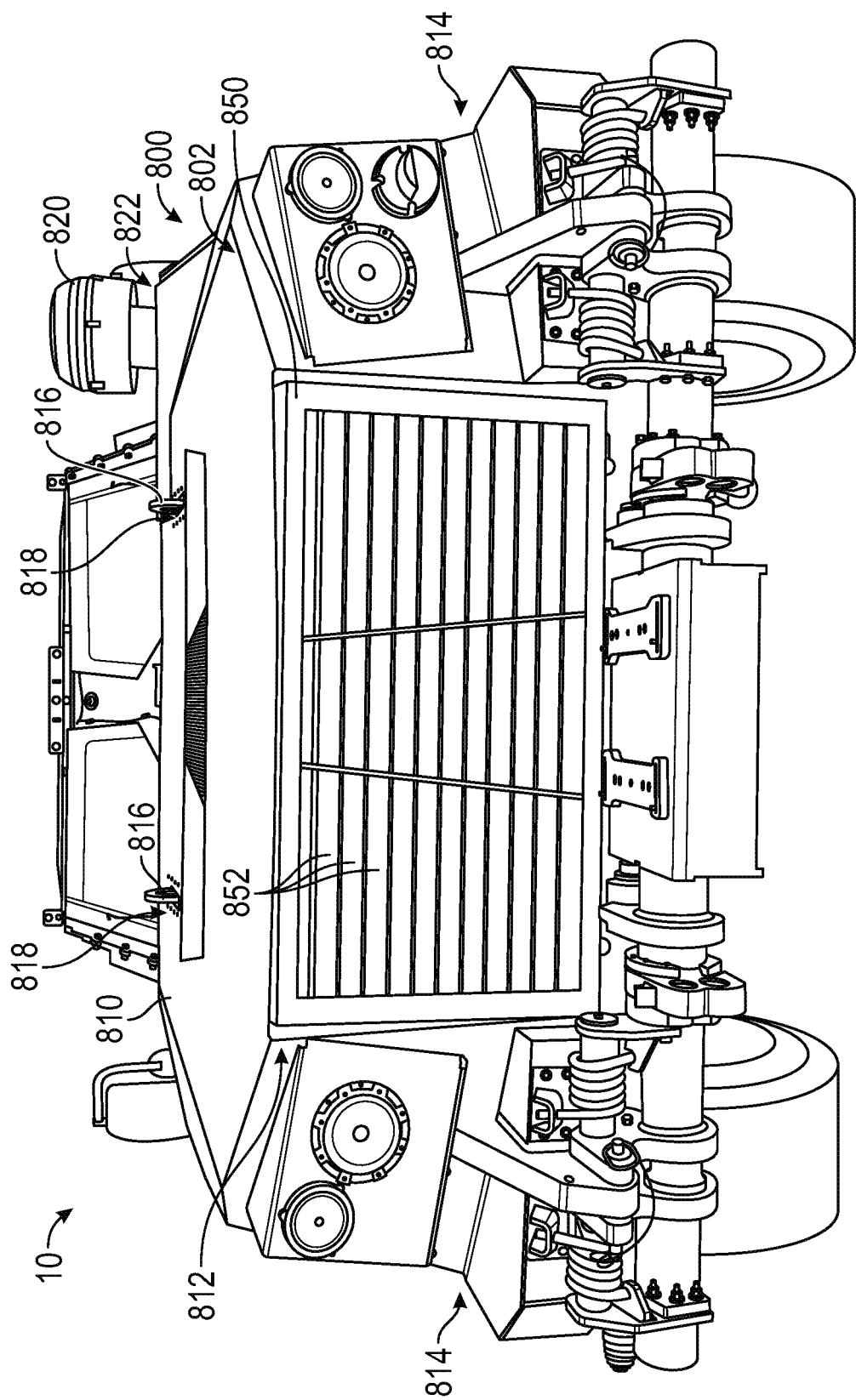
FIGS. 10, 11, 12, 13, and 14 are various views of the vehicle of FIG. 1 in a B-Kit configuration including a hood assembly according to another exemplary embodiment.
Figure 11:
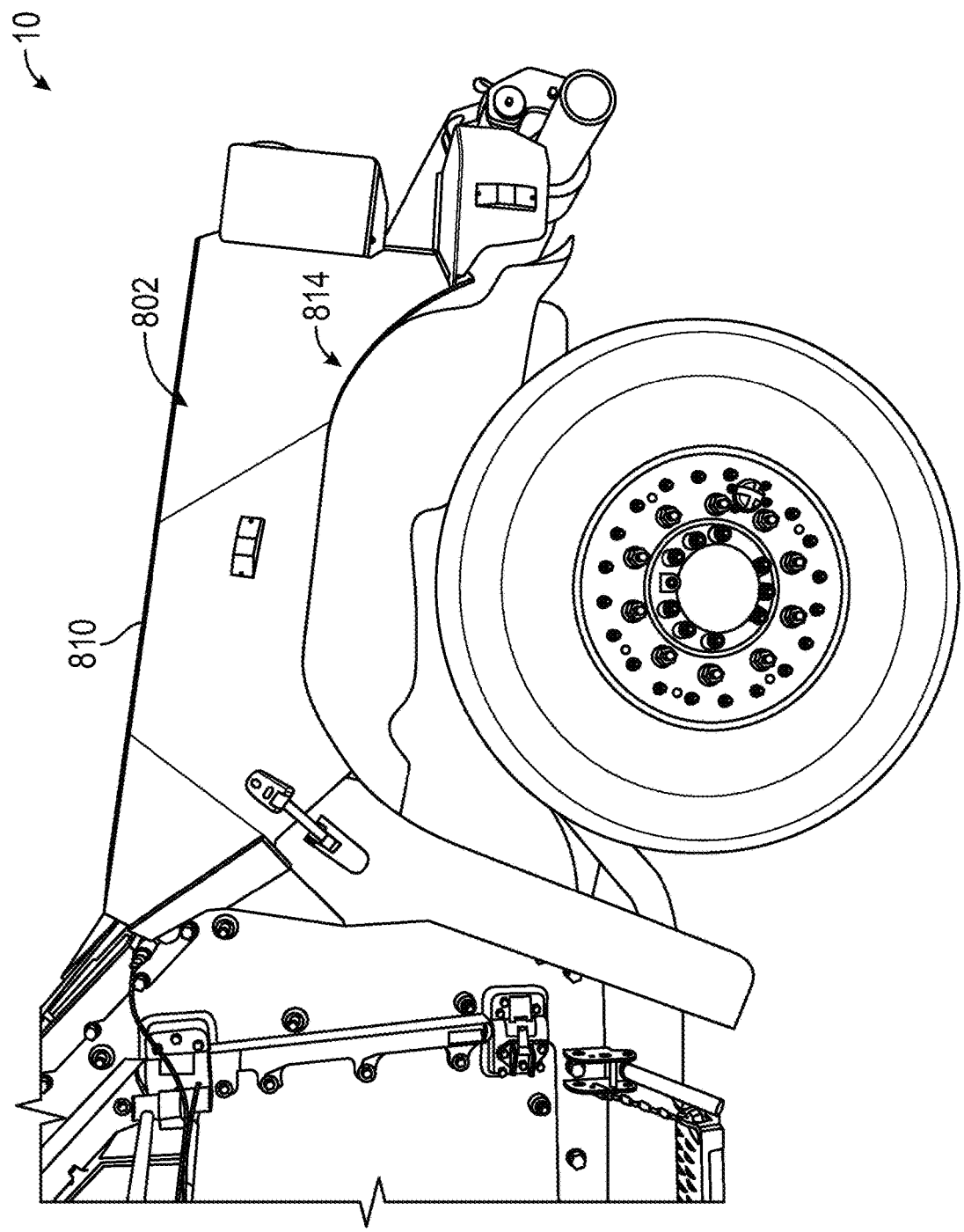
Figure 12:
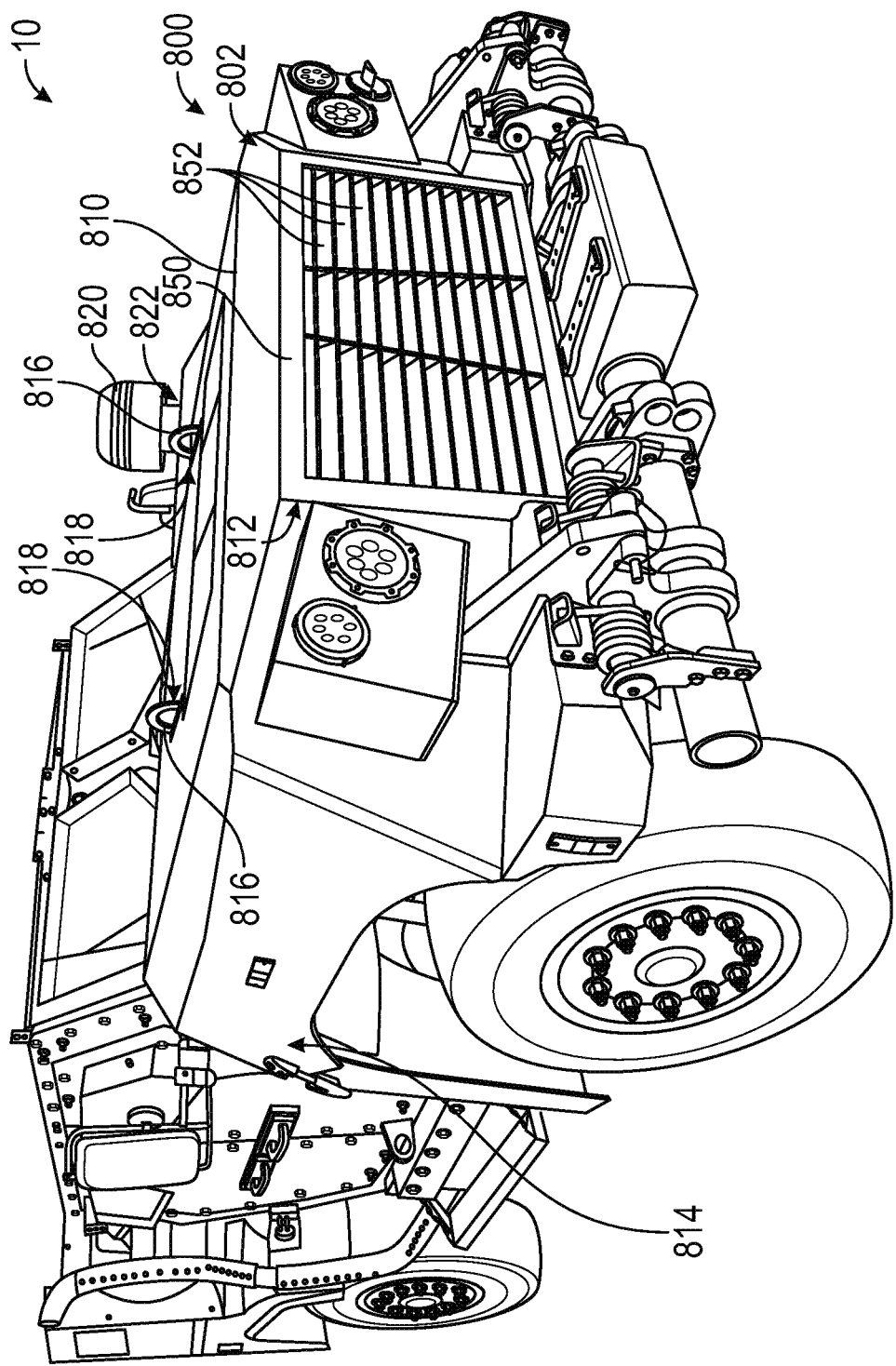
Figure 13:
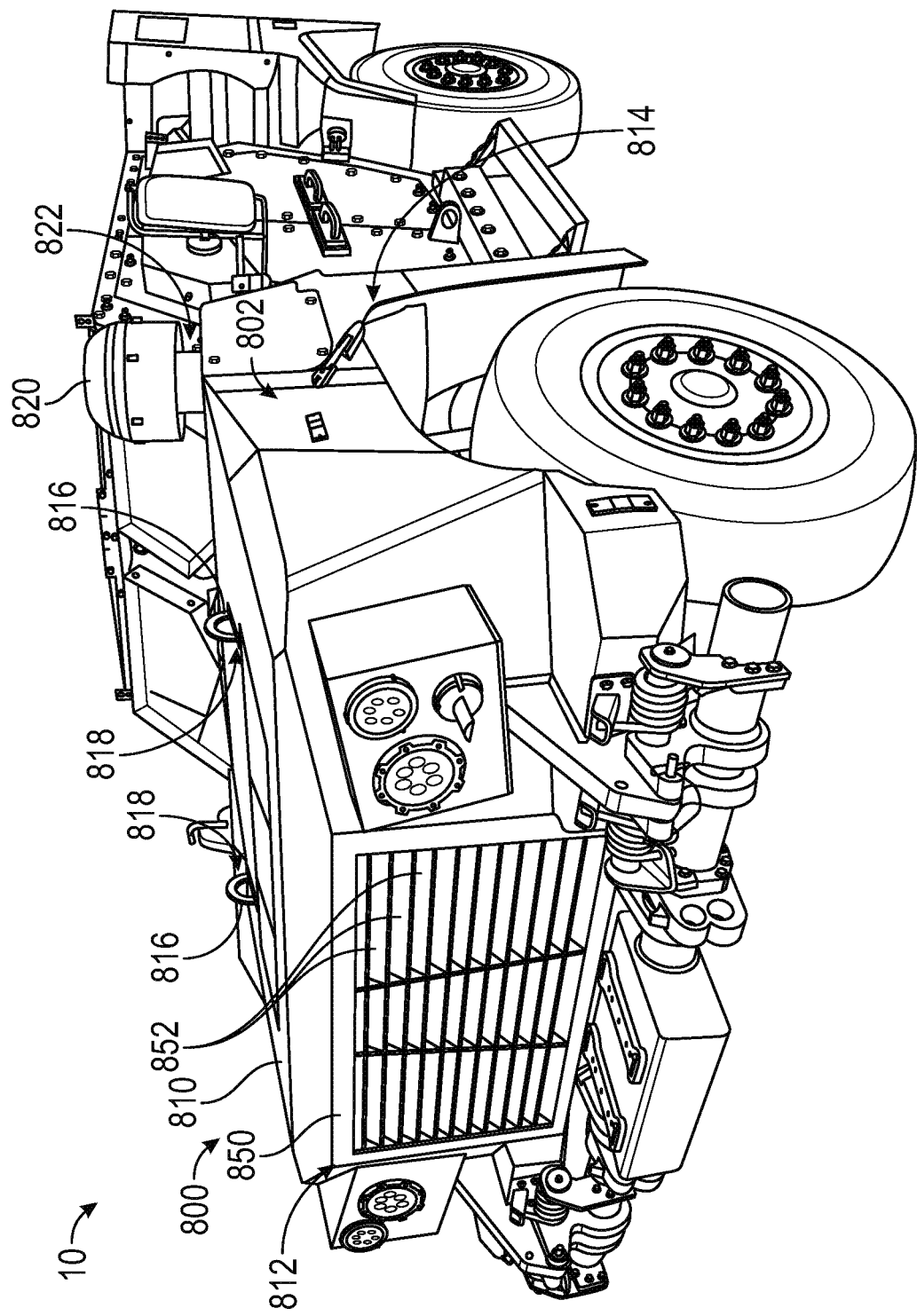
Figure 14:
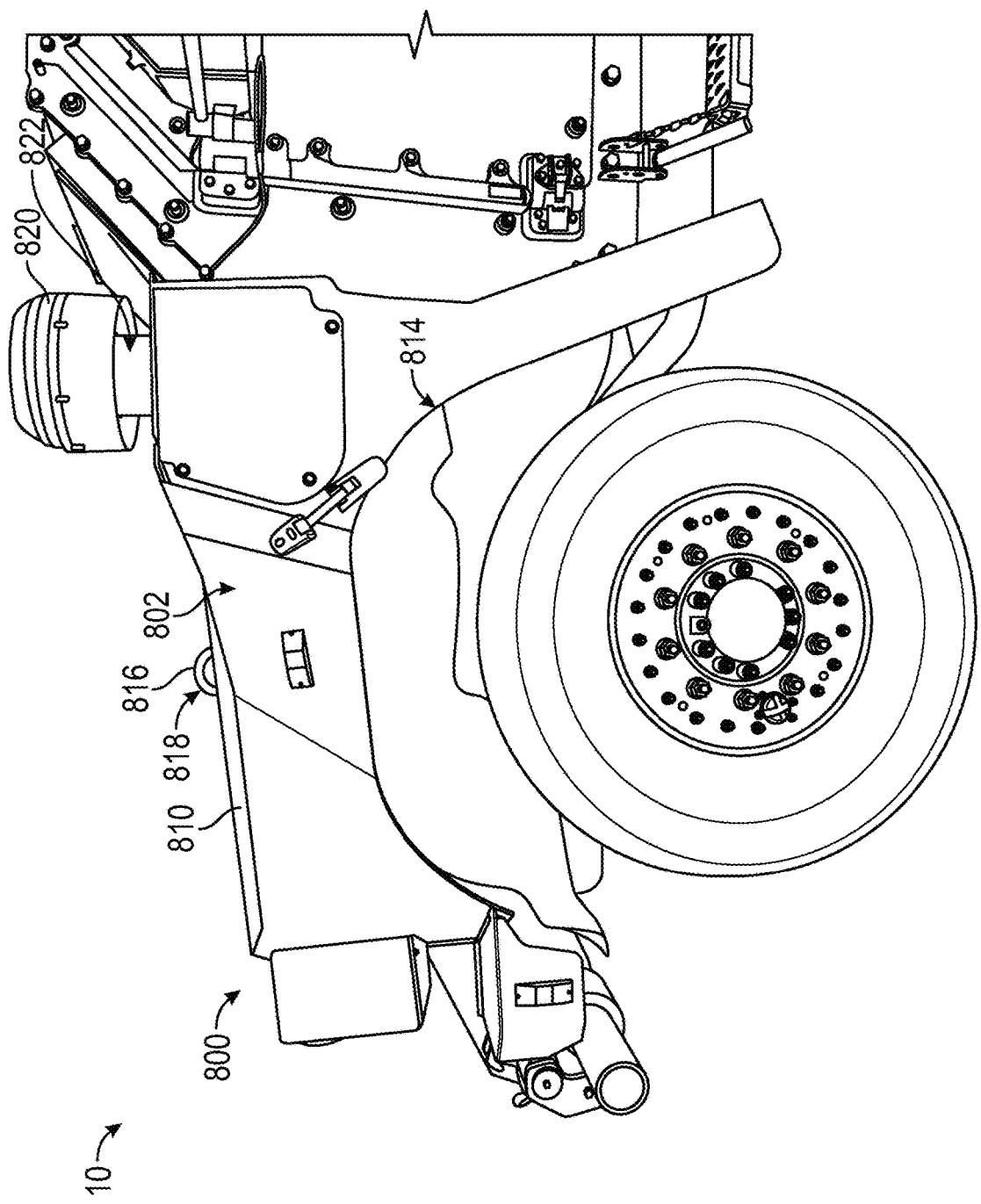

As shown in FIG. 9, the driveline 600 includes a first driver (e.g., an internal combustion engine), shown as engine 610; a transmission device, shown as transmission 620; a first drive shaft, shown transaxle drive shaft 630, coupled to the transmission 620; a power splitter, shown as transaxle 640, coupled to the transaxle drive shaft 630 and the rear axle assembly 500; a second drive shaft, shown as front axle drive shaft 650, extending between the transaxle 640 and the front axle assembly 500 (e.g., a front differential thereof); and a second driver (e.g., an electric motor/generator, an electromagnetic device, etc.), shown as electric motor 700, positioned between the engine 610 and the transmission 620.

As shown in FIG. 9, the engine 610 is positioned within the front module 300 and supported by the front subframe 310. As shown in FIG. 9, the electric motor 700 and the transmission 620 are positioned beneath the passenger capsule 200 within the tunnel slot 208 of the structural tunnel 206. The transaxle drive shaft 630 extends from the transmission 620 longitudinally along the structural tunnel 206 and within tunnel slot 208 to the transaxle 640. According to an exemplary embodiment, the transaxle 640 is positioned within the rear module 400 and supported by the rear subframe 410. As shown in FIG. 9, the front axle drive shaft 650 is positioned beneath the transaxle drive shaft 630 and outside of the tunnel slot 208 (e.g., between the transaxle drive shaft 630 and the v-shaped belly deflector 220).

According to various embodiments, the engine 610 is individually, the electric motor 700 is individually, or both the engine 610 and the electric motor 700 are cooperatively configured to provide power to the transmission 620 to drive the transmission 620 and, thereby, drive the transaxle drive shaft 630, the transaxle 640, the rear axle assembly 500, the front axle drive shaft 650, and the front axle assembly 500 to drive the vehicle 10.

In some embodiments, the engine 610 is an internal combustion engine (e.g., a diesel engine, a gasoline engine, etc.) powered by a combustible fuel. In embodiments, the electric motor 700 is an electric motor (e.g., an AC electric motor, a DC electric motor, etc.) powered by electrical energy (e.g., from a battery, from a capacitor, from a fuel cell, etc.). In other embodiments, the engine 610 and/or the electric motor 700 is a different type of driver (e.g., an internal combustion engine, an electric motor, etc.). In other embodiments, one of the engine 610 or the electric motor 700 is omitted.

Hood Configuration

As shown in FIGS. 1 and 2, the front module 300 includes a body panel, shown as hood 320, supported by the front subframe 310. The hood 320 partially surrounds components of the driveline 600 (e.g., an engine, radiators, etc.) of the vehicle 10. The hood 320 may be manufactured from a composite material (e.g., carbon fiber, fiberglass, a combination of fiberglass and carbon fiber, etc.) or a metal material (e.g., steel, aluminum, etc.). The hood 320 may be configured (e.g., shaped, etc.) to maximize vision while clearing under-hood components. In some embodiments, the hood 320 is used in a configuration of the vehicle 10 without a supplemental armor kit (e.g., an "A-Kit" configuration).

FIGS. 10-14 illustrate the vehicle 10 in an up-armored, supplementally-armored, enhanced protection, or "B-Kit" configuration. In the B-Kit configuration, the vehicle 10 is outfitted with a hood or cover assembly, shown as hood assembly 800. The hood assembly 800 may replace the hood 320. In some embodiments, the hood 320 and the hood assembly 800 (e.g., one or more components thereof) are each removably coupled to the vehicle 10 (e.g., to the front subframe 310), such that the vehicle 10 may be reconfigured between the A-Kit configuration and the B-Kit configuration as desired.

The hood assembly 800 has an interior volume, internal volume, or engine compartment, shown as hood volume 802, that receives a portion of the driveline 600. The hood assembly 800 may be configured to protect the driveline 600 (e.g., from explosives, from projectiles, such as bullets, from debris, etc.). In some embodiments, the hood assembly 800 is provides a greater damage resistance (e.g., a greater resistance to explosives, a greater resistance to projectiles, a greater level of protection, etc.) than the than the hood 320. The hood assembly 800 may be made from a metal (e.g., steel, iron, etc.) or another impact resistant material. In some embodiments, the hood assembly 800 includes or acts as armor plating.

The hood assembly 800 includes a first portion (e.g., a cover portion, a top portion, etc.), shown as hood 810, and a second portion (e.g., a ventilation portion, a front portion, etc.), shown as grille 850. The hood 810 and the grille 850 are each coupled to the front subframe 310. In some embodiments, the hood 810 and the grille 850 are separate components (e.g., that are movable relative to one another). In other embodiments, the hood 810 and the grille 850 are coupled to one another (e.g., as a subassembly, as a weldment, integrally formed as a single, continuous piece, etc.). In such embodiments, the hood 810 and the grille 850 may move relative to one another.

The hood 810 extends long a top side, a left side, a right side, and a front side of the vehicle 10. The hood 810 defines a first recess or portion, shown as grille recess 812, that receives the grille 850. In embodiments where the hood 810 moves relative to the grille 850, the grille recess 812 may provide clearance between the grille 850 and the hood 810 during such movement. In embodiments where the hood 810 and the grille 850 do not move relative to one another, the grille recess 812 may be omitted.

The hood 810 further defines a pair of wheel-receiving portions, shown as wheel wells 814. The wheel wells 814 are positioned on the right side and the left side of the vehicle 10, respectively. Each of the wheel wells 814 receives a tractive element (e.g., a wheel) of the front axle assembly 500, covering the tractive element. The wheel wells 814 are sized to provide clearance that permits rotation of the wheels when driving the vehicle and when turning.

The front subframe 310 includes a pair of lift hoops or interfaces, shown as lift points 816. Each of the lift points 816 defines an aperture that may receive a hook, chain, rope, or cable, to facilitate lifting of the vehicle 10 (e.g., during transport or maintenance). The hood 810 defines a pair of apertures, shown as lift point apertures 818, positioned along a top surface of the hood 810. The lift point apertures 818 each receive one of the lift points 816 therethrough. The lift point apertures 818 facilitate accessing the lift points 816 with the hood 810 in a closed position.

The vehicle 10 includes an air intake, conduit, or snorkel, shown as intake 820. The intake 820 may be configured to supply air to the driveline 600 (e.g., to facilitate combustion of fuel). The intake 820 extends vertically upward along a rear, left side of the hood assembly 800. The hood 810 includes a notch or cutout, shown as intake cutout 822. The intake cutout 820 may facilitate movement of the hood 810 relative to the intake 820.

The grille 850 is positioned along a front side of the vehicle 10. The grille 850 may be configured to facilitate airflow longitudinally into the hood volume 802 (e.g., to facilitate cooling). As shown, the grille 850 includes a series of laterally-extending members or slats, shown as louvers 852. The louvers 852 are vertically offset from one another to define passages for air to enter the hood volume 802.

Vented Hood

Figure 15:
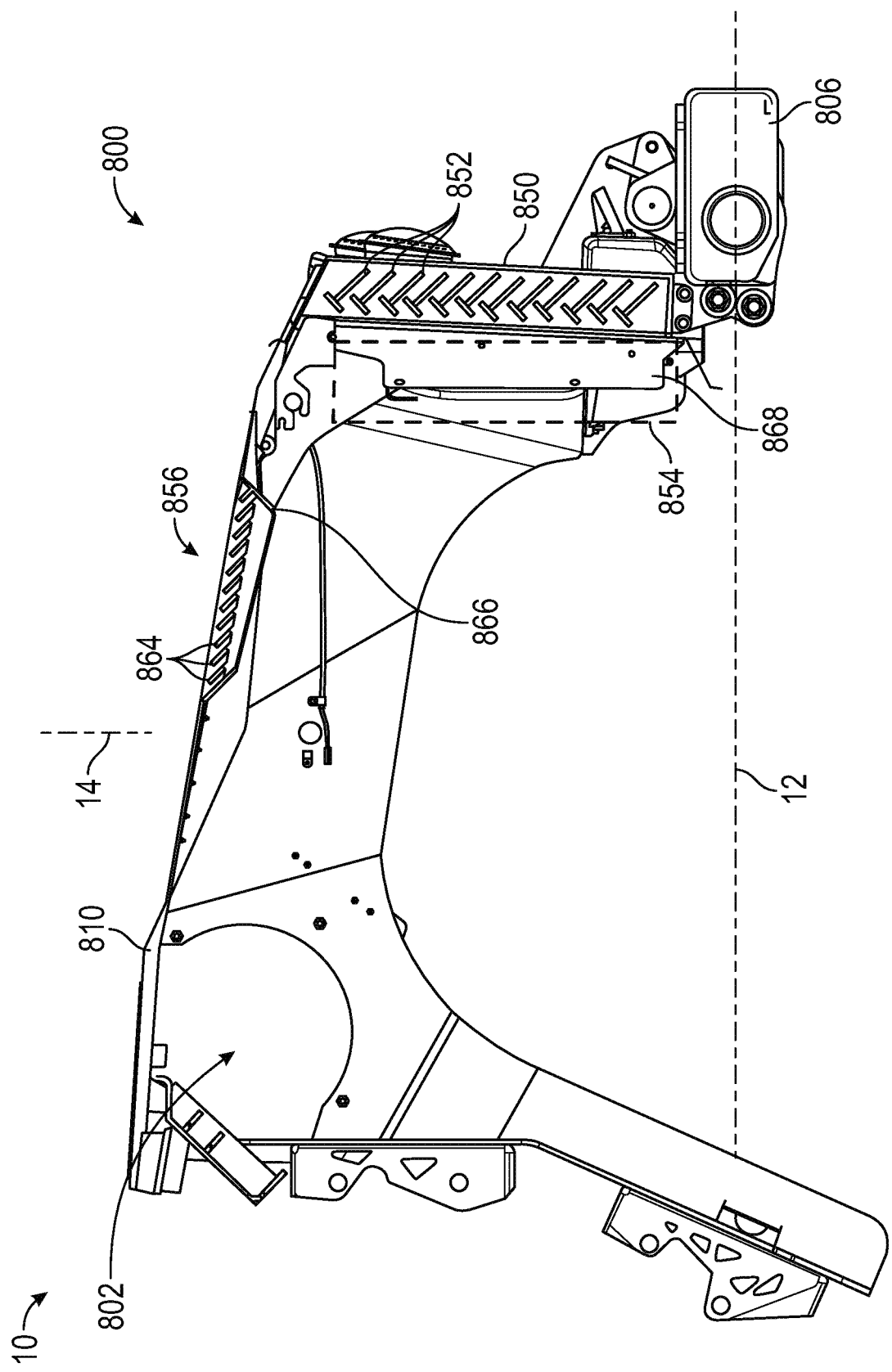
FIG. 15 is a side view of a portion of the hood assembly of FIGS. 10, 11, 12, 13, and 15, according to another exemplary embodiment.
Figure 16:
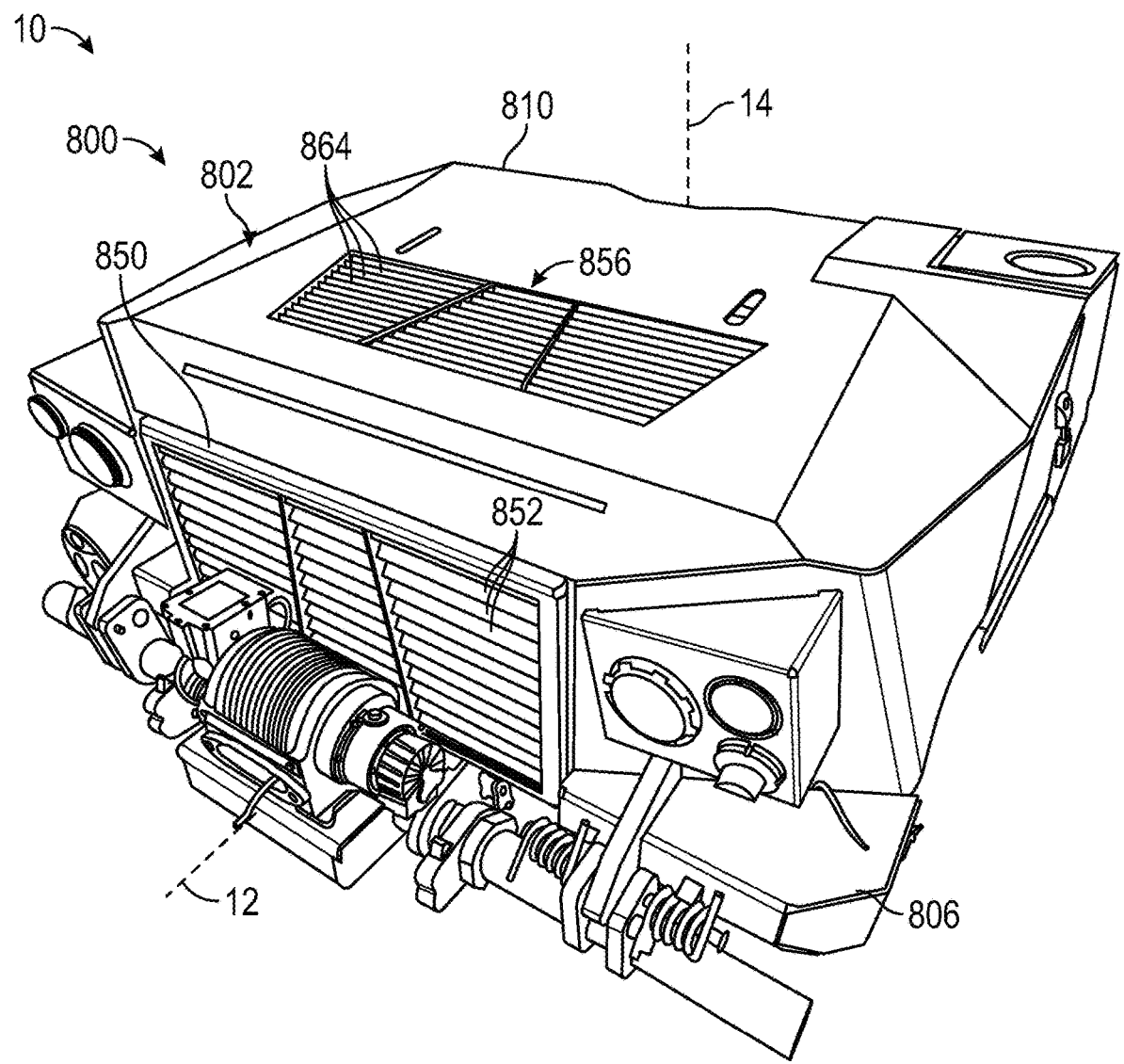
FIG. 16 is a perspective view of the hood assembly of FIG. 15, according to an exemplary embodiment.
Figure 17:
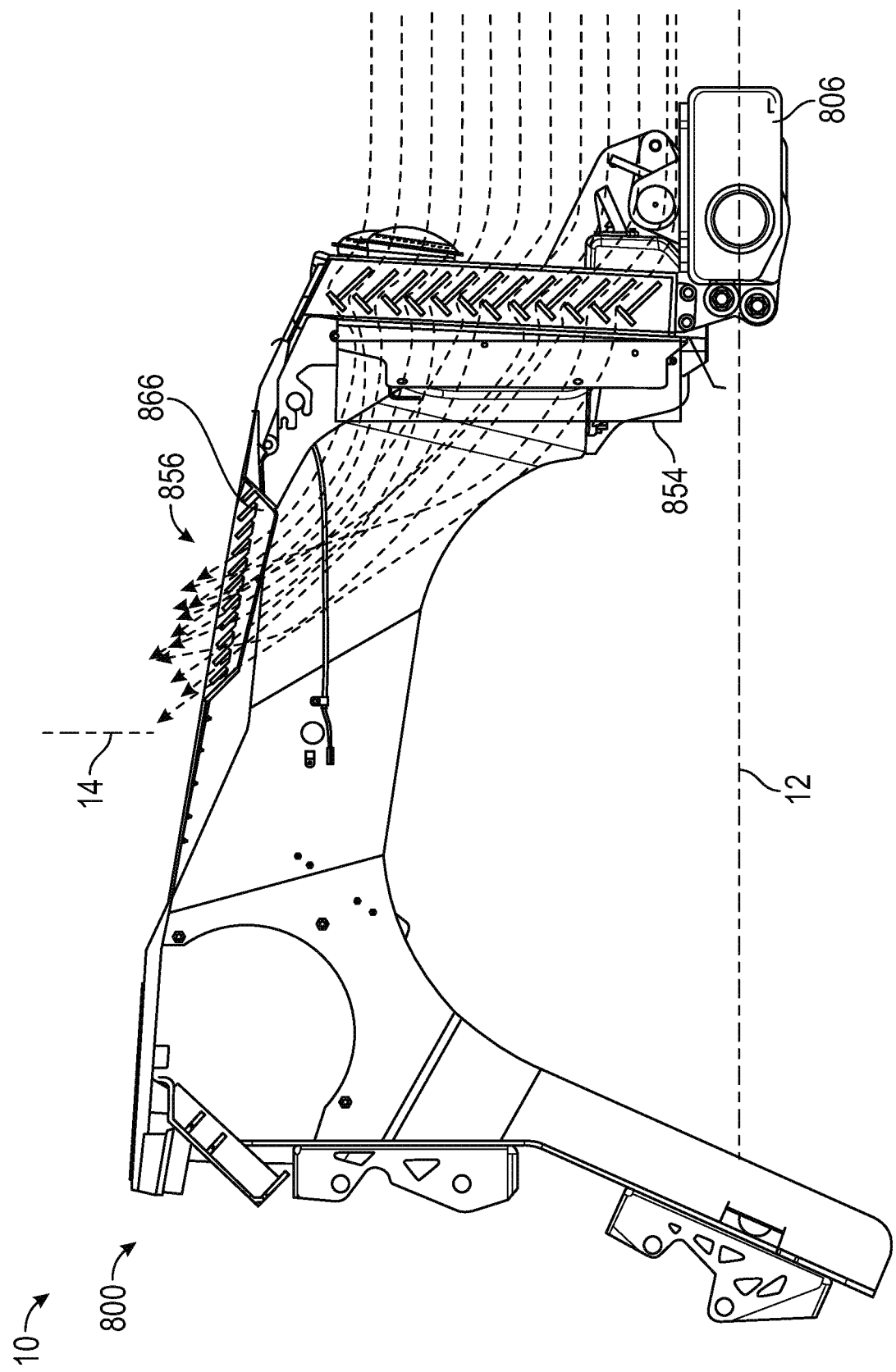
FIG. 17 is a side view of a portion of the hood assembly of FIG. 15, according to an exemplary embodiment.

Referring to FIGS. 15-19, the hood assembly 800 is shown in greater detail, according to an exemplary embodiment. In particular, the hood assembly 800 is configured to vent, guide, induce, direct, channel, bias, etc., air along a flow path to dissipate heat from a radiator, engine, etc., of the vehicle 10 or any other component of the vehicle 10 within the hood volume 802 that emits heat. The hood assembly 800 may facilitate forced convection that results from the air flowing over, through, around, about, across, etc., the one or more components of the vehicle 10 that are positioned within the hood volume 802. In some embodiments, the hood assembly 800 facilitates forced convective heat transfer to dissipate heat from the components of the vehicle 10 to surrounding environment. For example, air may enter the hood volume 802 due to motion of the vehicle 10, absorb heat transferred from the components of the vehicle 10 within or proximate the hood volume 802, and be emitted out of the hood volume 802 into surrounding environment. The vehicle 10 defines a longitudinal axis 12 and a vertical axis 14. As shown in FIGS. 15 and 17 the vehicle 10 includes a radiator 854 (e.g., a heat exchanger and a fan) positioned rearwardly of the grille 850. The radiator 854 may be positioned directly behind the grille 850 or spaced a distance behind the grille 850. The radiator 854 is coupled with radiator support members 868 that are coupled with the frame 806. The grille 850 is also coupled (e.g., fixedly) with the frame 806.

The hood assembly 800 includes the hood 810, which may be stationary relative to a frame 806 of the vehicle 10, rotatable or pivotable relative to the frame 806 of the vehicle 10, or otherwise coupled (e.g., removably, interlockingly, etc.) with the frame 806 of the vehicle 10. The hood 810 and the grille 850 cooperatively define a flow path from an exterior of the vehicle 10 directly in front of the grille 850, through the hood volume 802 and out of the hood volume 802 through vents 856 in the hood 810. The vents 856 define a plurality of passageways, openings, etc., to fluidly couple the hood volume 802 with an exterior of the hood 810. As the vehicle 10 travels, air is introduced into the hood volume 802 through the grille 850 (e.g., through passageways defined between the louvers 852), through the radiator 854, and exits the hood volume 802 through the vents 856 in the hood 810. FIG. 17 illustrates the airflow from an exterior of the vehicle 10 in front of the grille 850, through the grille 850, through the radiator 854, through the hood volume 802, and out of the hood volume 802 through the vents 856. The vents 856 can be or include louvres 864 that are angled to extend in a rearwards direction (e.g., along the longitudinal axis 12 towards a rear of the truck). The angulation of the vents 856 may facilitate a streamlined vehicle 10 as the vehicle 10 transports. As shown in FIG. 17, the air may travel in a generally longitudinal direction (e.g., along the longitudinal axis 12) and an upwards direction (e.g., along the vertical axis 14) as the air passes through the grille 850 into the hood volume 802, and out of the hood volume 802 through the vents 856 that are disposed in a top of the hood 810. As shown in FIGS. 15 and 17, the louvres 852 of the grille 850 may have a cross-sectional shape including two straight portions. For example, the louvres 852 can have an L-shaped or T-shaped cross section that is angled such that air is directed upwards and then downwards as the air passes through the grille 850. The cross-sectional shape of the louvres 852 can control an airflow rate as the air passes through the grille 850.

Figure 18:
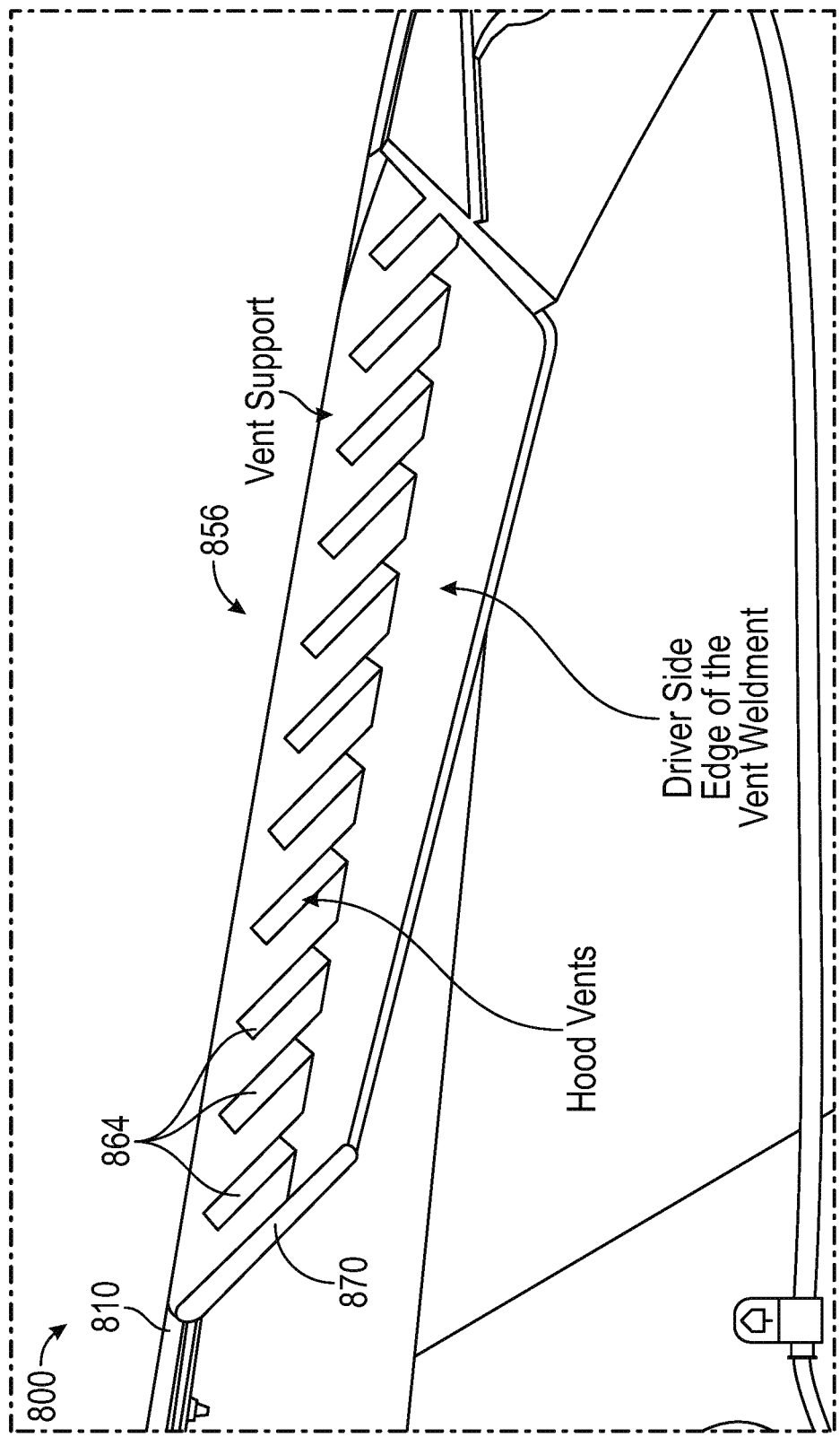
FIG. 18 is a side view of a portion of the hood assembly of FIG. 15, according to an exemplary embodiment.

As shown in FIG. 18, the vents 856 include a baffle 866 (e.g., a fin, a plate, an air guide, etc.) positioned at a front of the vents 856 and a structural member 870 (e.g., a fin, a plate, an air guide, etc.) positioned at a rear or back of the vents 856. The baffle 866 and the structural member 870 can have generally flat shapes provided at different angles to facilitate controlled airflow at the vents 856. In particular, the baffle 866 may extend in a downwards and rearwards direction (e.g., downwards along the vertical axis 14 towards a bottom of the vehicle 10 and rearwards along the longitudinal axis 12 of the vehicle 10 towards a rear of the vehicle 10). More particularly, the baffle 866 can extend in a direction away from the grille 850 along the longitudinal axis 12 and in a direction towards the grille 850 along the vertical axis 14. The structural member 870 can extend in a frontwards and downwards direction (e.g., along the longitudinal axis 12 in a direction towards the front of the vehicle 10 and along the vertical axis 14 in a direction towards the bottom of the vehicle 10) and can be configured to catch air and direct the air out of the hood volume 802 through the vents 856.

Figure 19:
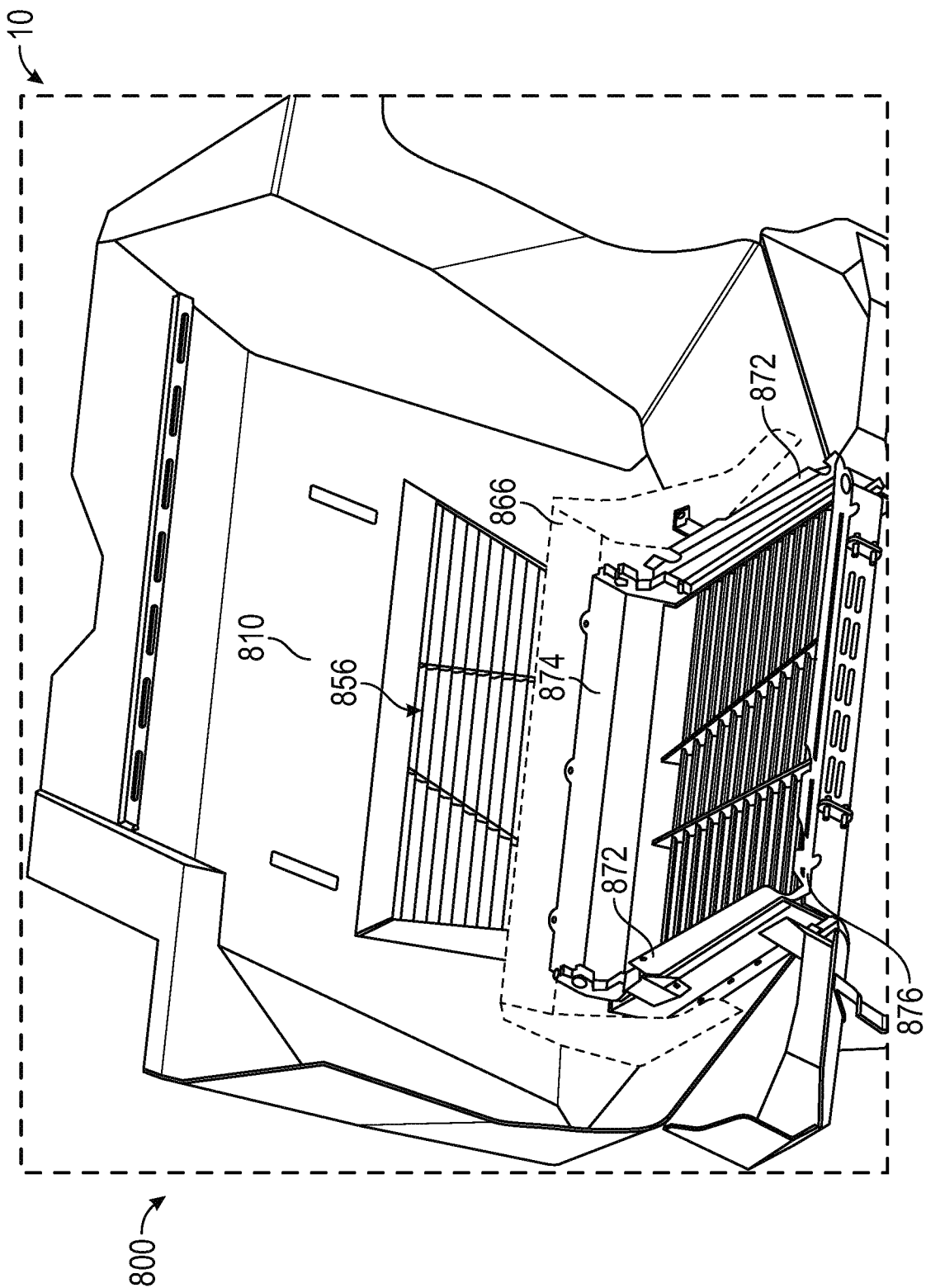
FIG. 19 is a perspective view of a portion of the hood assembly of FIG. 15, according to an exemplary embodiment.
Figure 20:
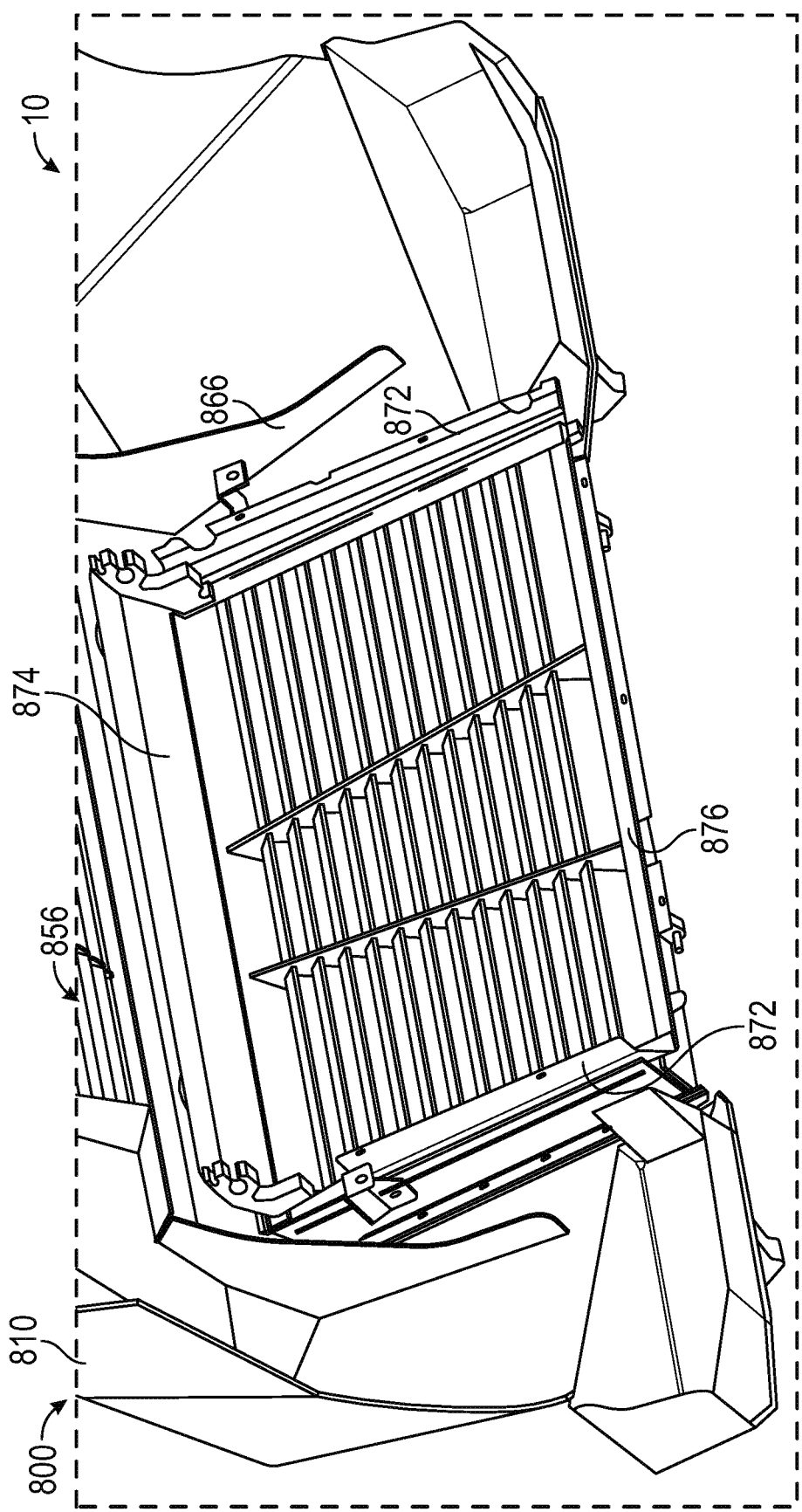
FIG. 20 is a perspective view of a portion of the hood assembly of FIG. 15, according to an exemplary embodiment.
Figure 21:
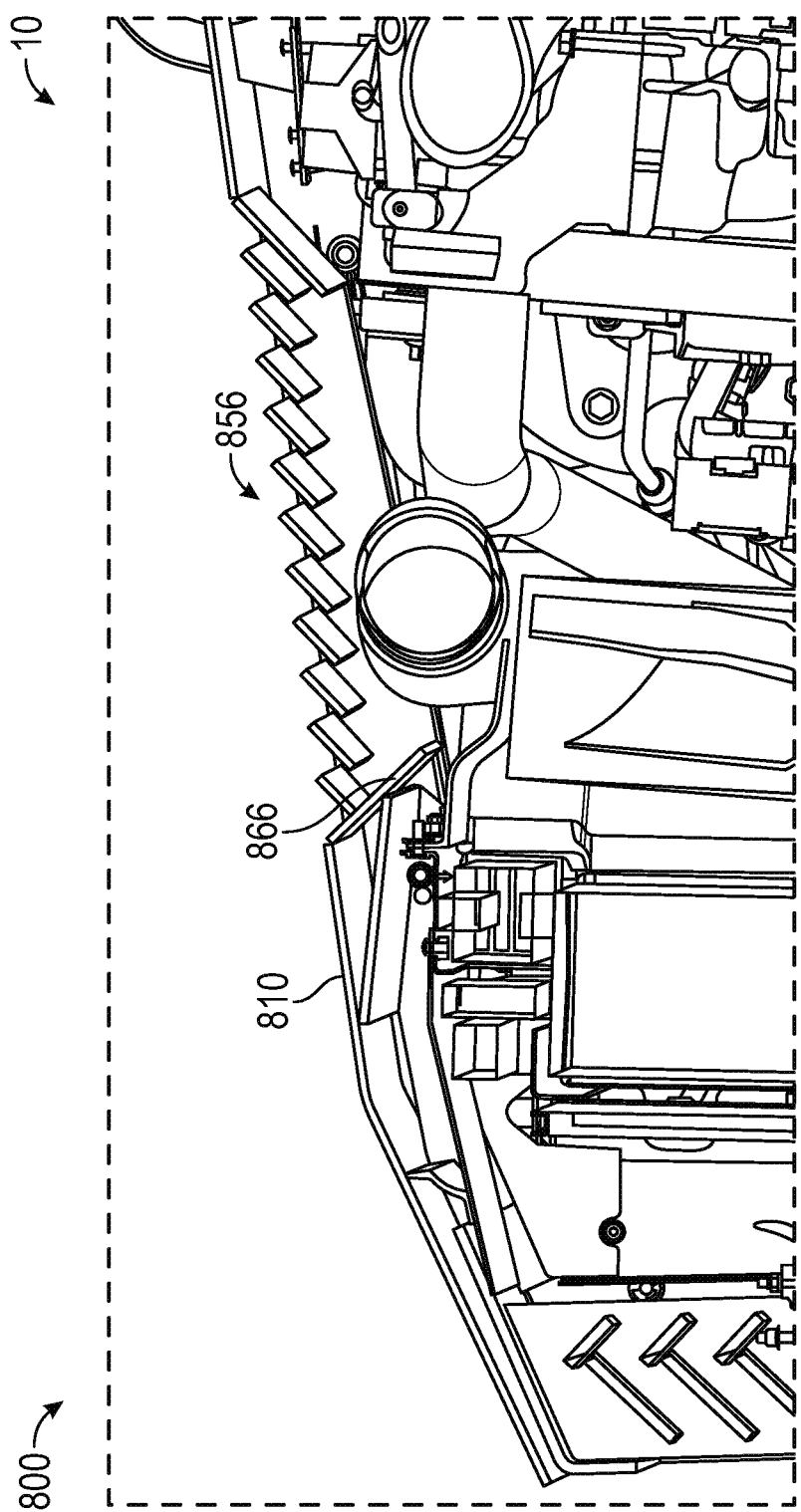
FIG. 21 is a side sectional view of a portion of the hood assembly of FIG. 15, according to an exemplary embodiment.

Referring to FIGS. 15, 17, and 18-21, the baffle 866 also functions to limit airflow in an opposite direction (e.g., to limit air from entering the hood volume 802 through the vents 856). For example, in vented hoods that do not include the baffle 866, air may enter the hood volume 802 through the vents 856 at certain speeds or pressures or due to operation of a radiator fan, which, combined with the forced airflow through the grille 850 and out of the vents 856, may cause opposing air currents directly above the radiator 854. This airflow can cause turbulence above and at the radiator 854 or pockets of stalled air which may decrease an amount of heat dissipated by the radiator 854. However, the baffle 866 advantageously provides a physical barrier that reduces or limits air from entering the hood volume 802 through the vents 856. The baffle 866 may have vertically extending portions or arms as shown in FIG. 19.

Figure 22:
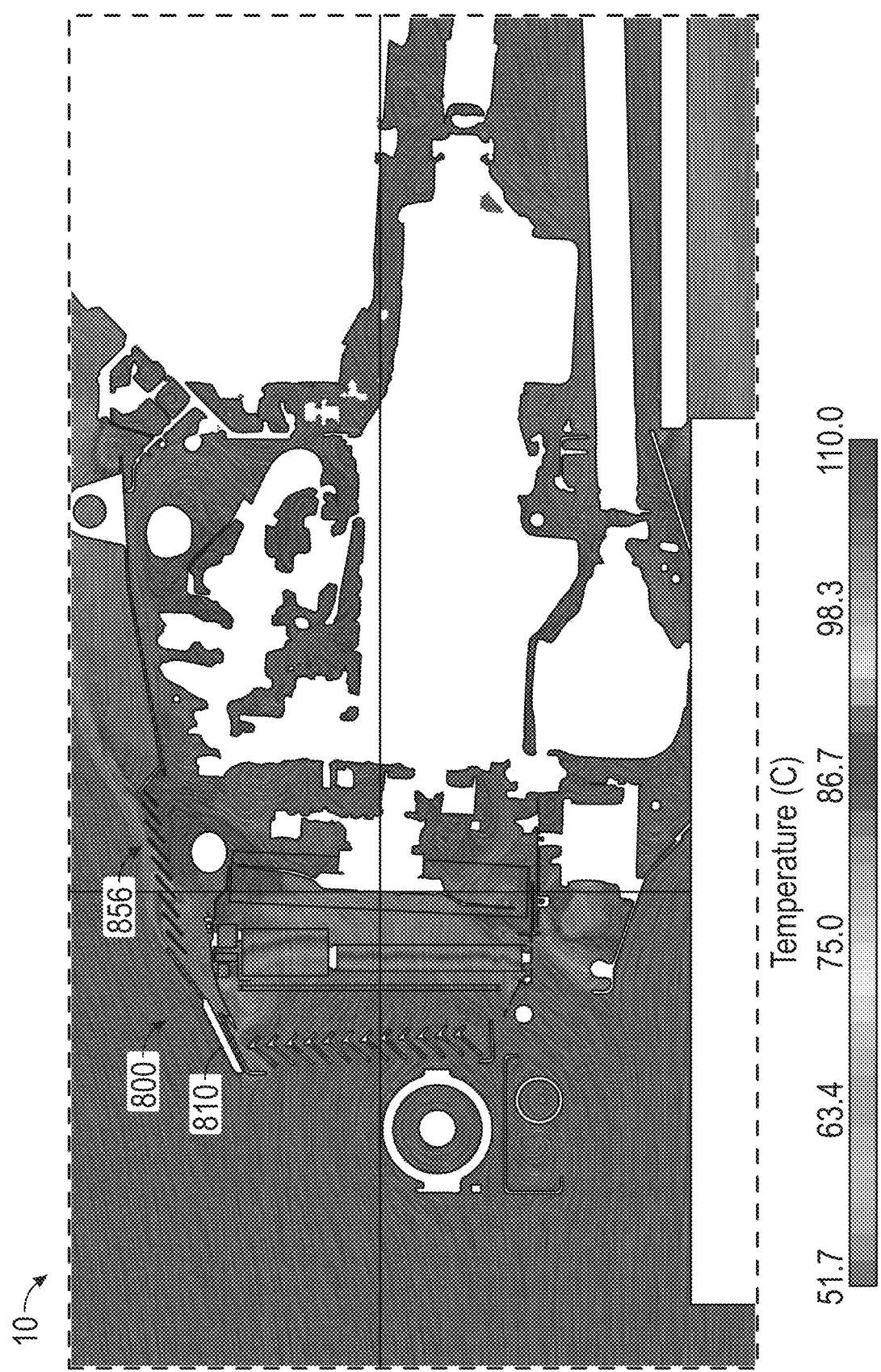
FIG. 22 is a side view of simulation results of the hood assembly of FIG. 15 without including a baffle, according to an exemplary embodiment.
Figure 23:
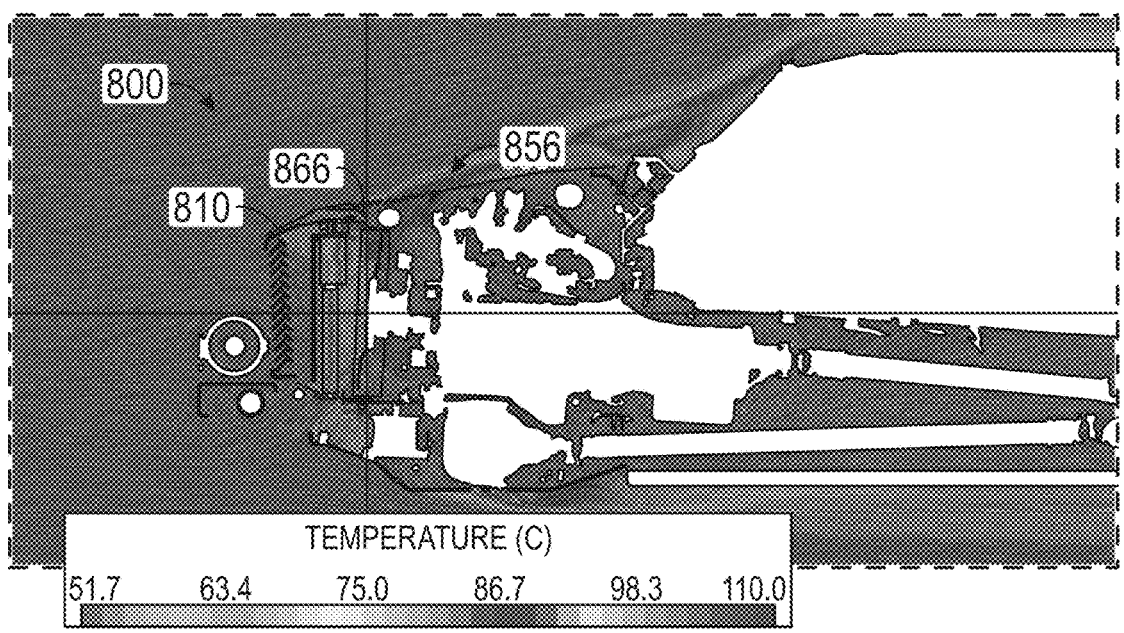
FIGS. 23-24 are side view of simulation results of the hood assembly of FIG. 15 including a baffle, according to an exemplary embodiment.
Figure 24:
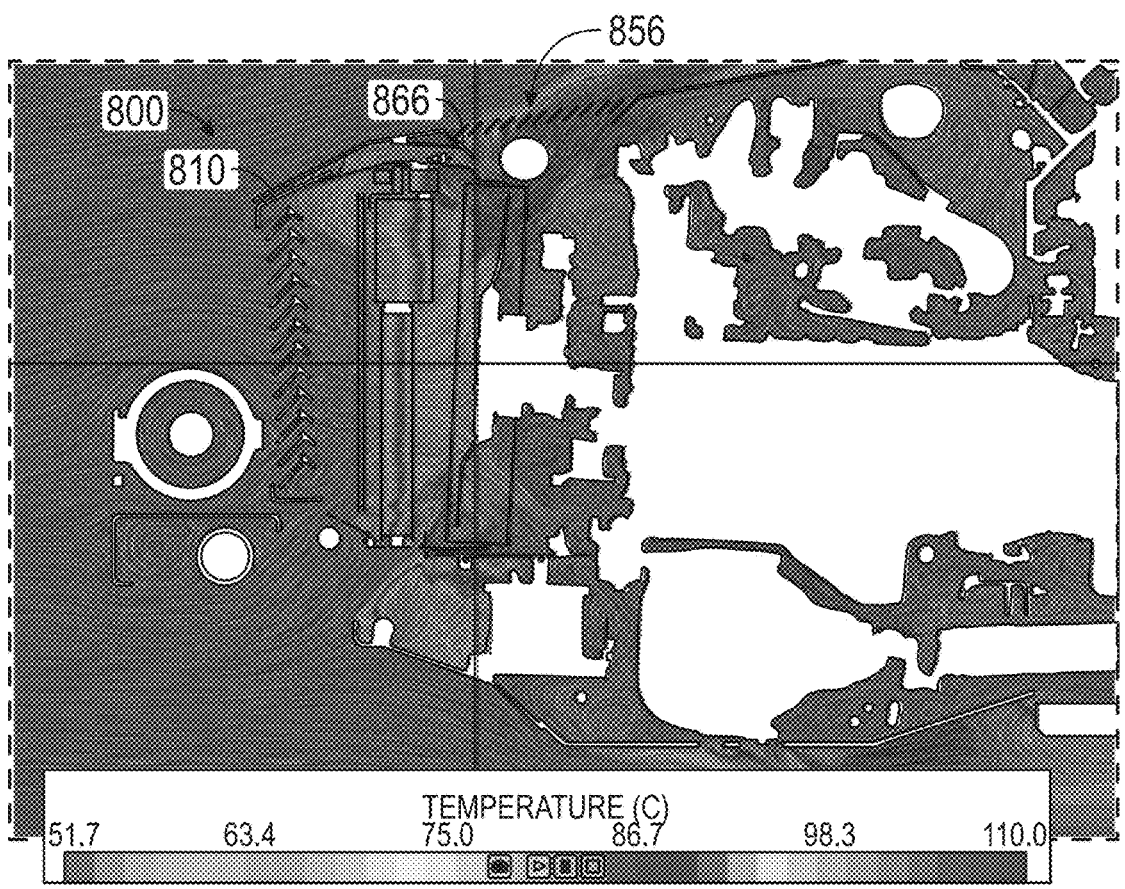
Figure 25:
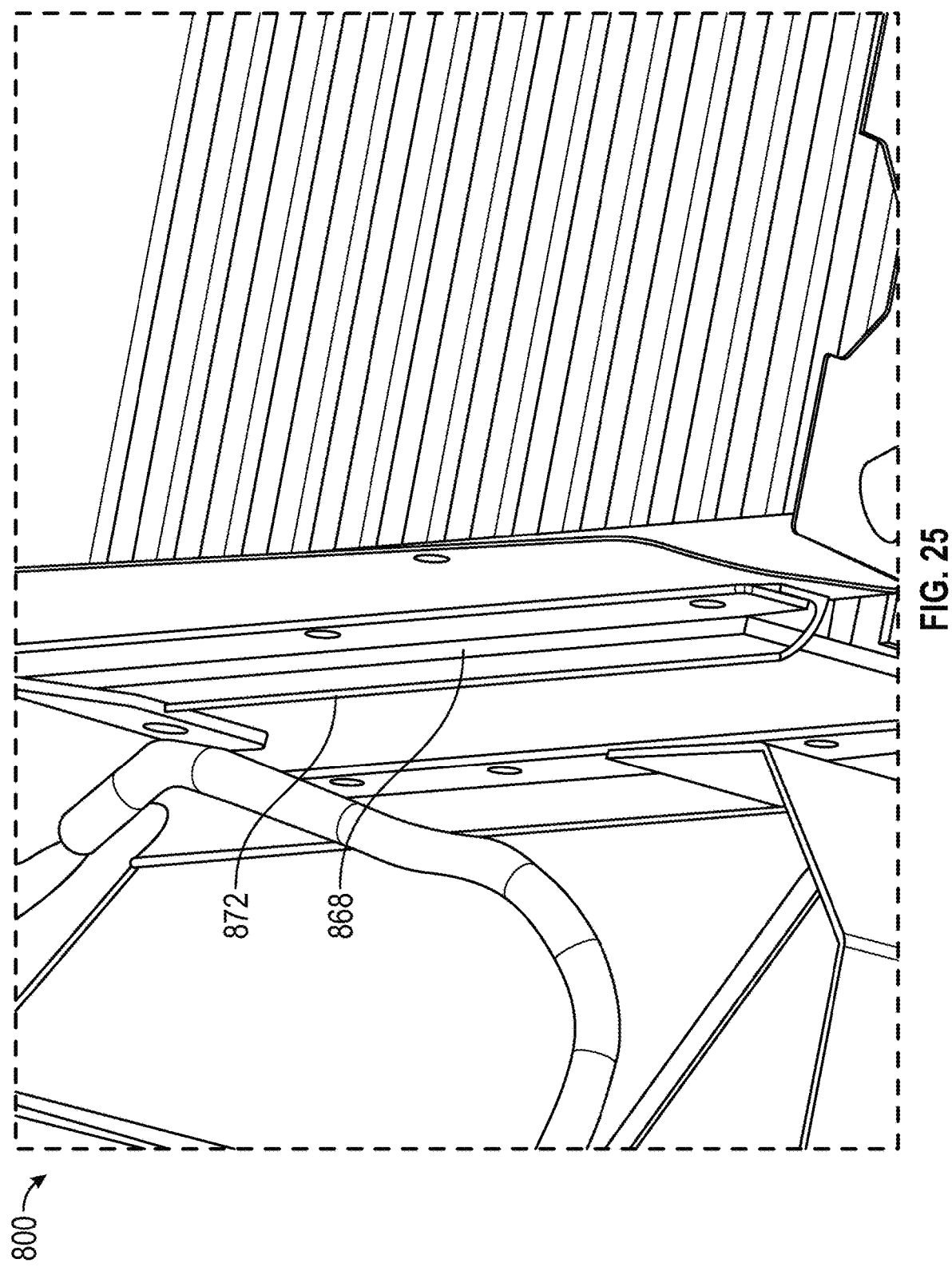
FIG. 25 is a perspective view of a portion of the hood assembly of FIG. 15 showing radiator seals, according to an exemplary embodiment.
Figure 26:
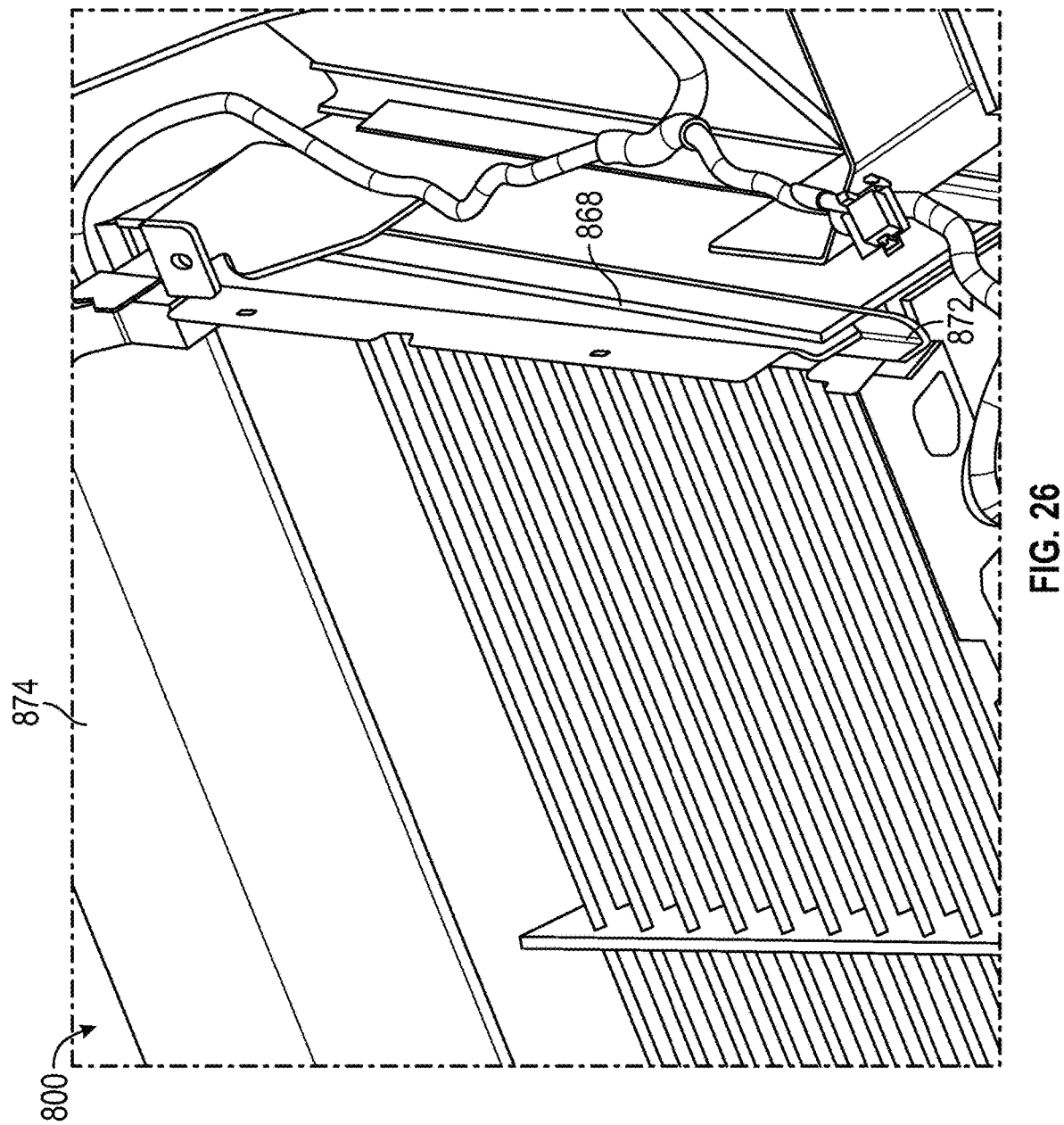
FIG. 26 is a perspective view of a portion of the hood assembly of FIG. 15 showing radiator seals, according to an exemplary embodiment.

FIGS. 22 and 23-24 illustrate simulation test results for a hood assembly without the baffle 866 and with the baffle 866. Specifically, FIG. 22 illustrates airflow and temperatures throughout the hood assembly 800 without the baffle 866 and FIGS. 23-24 illustrate airflow and temperatures throughout the hood assembly 800 with the baffle 866. As shown in FIG. 22 compared to FIGS. 23-24, the turbulence and temperature above the radiator 854 is reduced when the baffle 866 is used to limit or prevent air from entering the hood volume 802 through the vents 856.

As shown in FIGS. 19-20, 25-26, and 28, the hood assembly 800 can include one or more seals that reduce, mitigate, or limit recirculation of air through the radiator 854 or around the radiator 854, according to an exemplary embodiment. The hood assembly 800 can include one or more side seals 872 that extend in a generally vertical direction along either side of the radiator 854. Specifically, the side seals 872 are positioned between the left and right or driver and passenger sides of the radiator support members 868 and the sides of the hood 810 and sealingly couple with corresponding surfaces of the radiator support members 868 and the sides of the hood 810. The side seals 872 can extend along an entire height of the radiator 854. The side seals 872 limit or prevent air from flowing around the radiator 854 after entering the hood volume 802 through the grille 850.

The hood assembly 800 also includes a bottom seal 876 that extends laterally across the bottom of the radiator 854. The bottom seal 876 can be positioned between and sealingly couple with a bottom support member of the radiator 854 and a corresponding surface of portion of a bumper, bottom portion of the hood 810, etc. The bottom seal extends in a substantially lateral direction perpendicular to both the longitudinal axis 12 and the vertical axis 14 between the radiator support members 868 that are positioned on either side of the radiator 854.

The hood assembly 800 also includes a top seal 874 that extends laterally across the top of the radiator 854. The top seal 874 can be positioned between and sealingly couple with an upper support member of the radiator 854 and a corresponding portion or surface of the hood 810. The hood assembly 800 also includes corner seals 878 positioned at corners of the radiator 854 (e.g., top and bottom corners) between the seals 872 and the top seal 874, and/or between the seals 872 and the bottom seal 876. In some embodiments, the seals 872, 878, 876, or 874 sealingly couple with a peripheral portion of the grille 850. In some embodiments, the seals 872, 874, or 876 are a rubber material or any other material that is thermally resistive (e.g., can withstand high heats) and still maintain sealing engagement.

Figure 27:
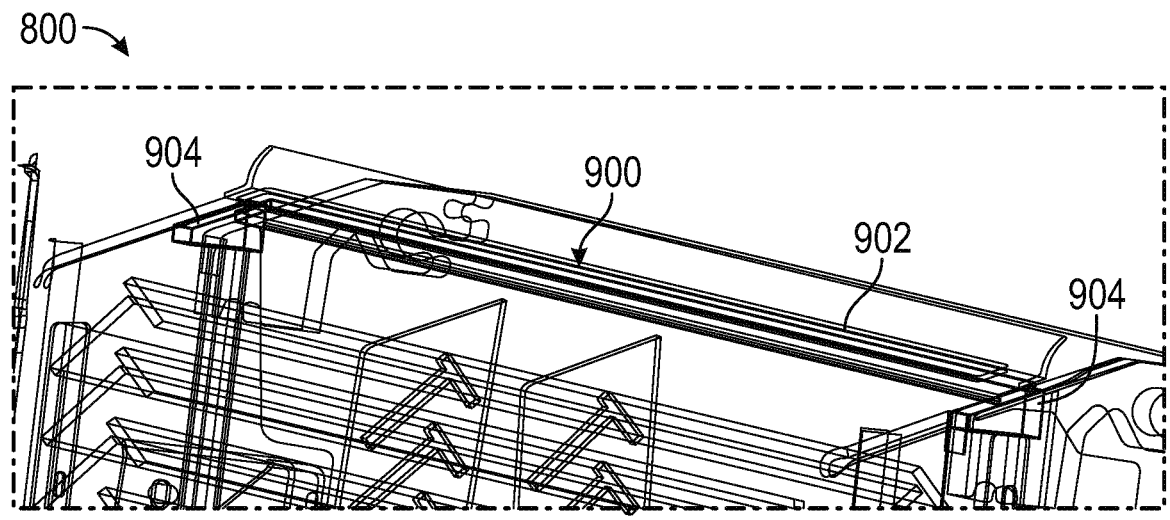
FIG. 27 is a perspective view of a portion of the hood assembly of FIG. 15 showing a foam seal on top of the radiator, according to an exemplary embodiment.
Figure 28:
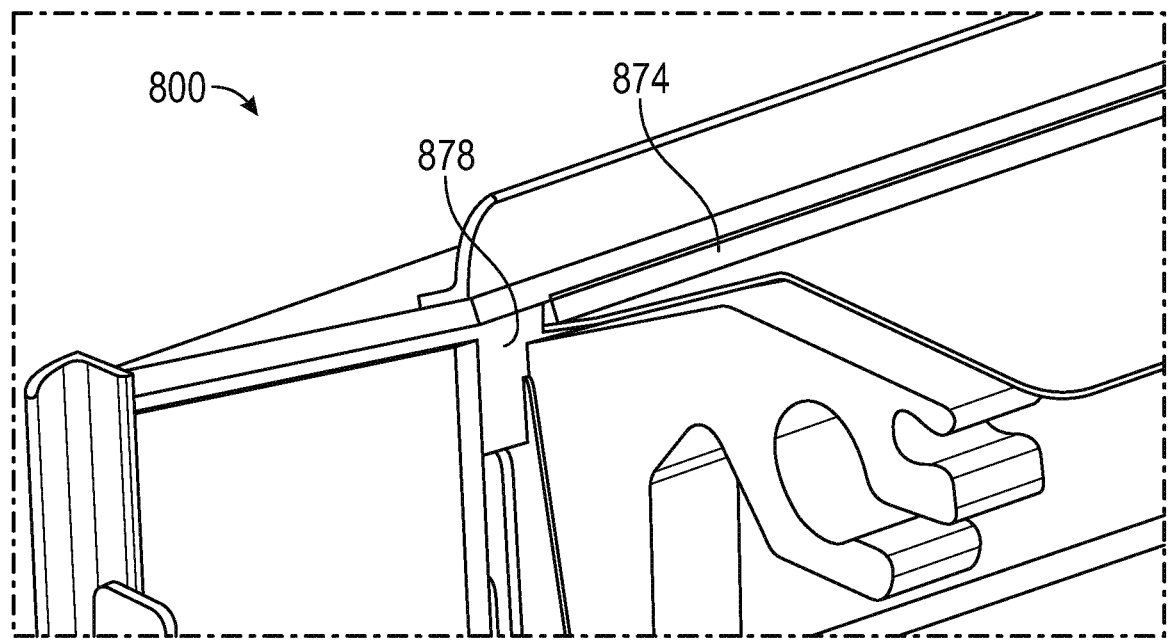
FIG. 28 is a perspective view of a portion of the hood assembly of FIG. 15 showing radiator seals, according to an exemplary embodiment.

As shown in FIG. 27, the hood assembly 800 may include a foam seal 900 positioned at a top of the radiator 854. The foam seal 900 can include a laterally extending portion 902 and corner portions 904. The laterally extending portion 902 extends between the corner portions 904 across the entire top of the radiator 854. The foam seal 900 advantageously facilitates reduced hot air recirculation at the top of the radiator 854 which can facilitate improved heat dissipation.

Figure 29:
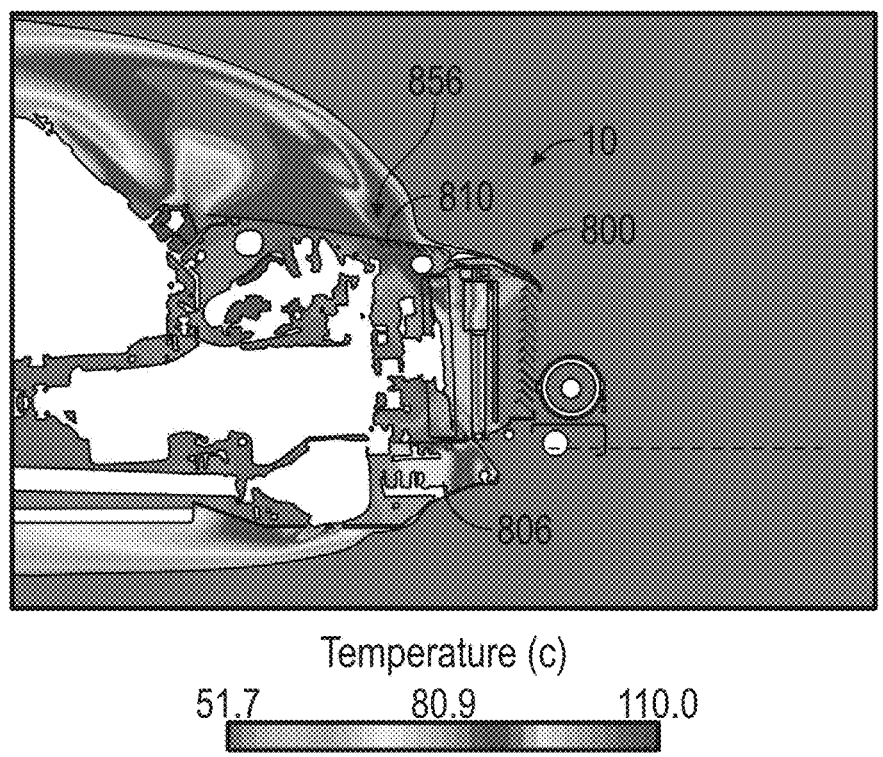
FIGS. 29 and 30 are side views of test simulations of the hood assembly of FIG. 15 illustrating heat dissipation, according to exemplary embodiments.
Figure 30:
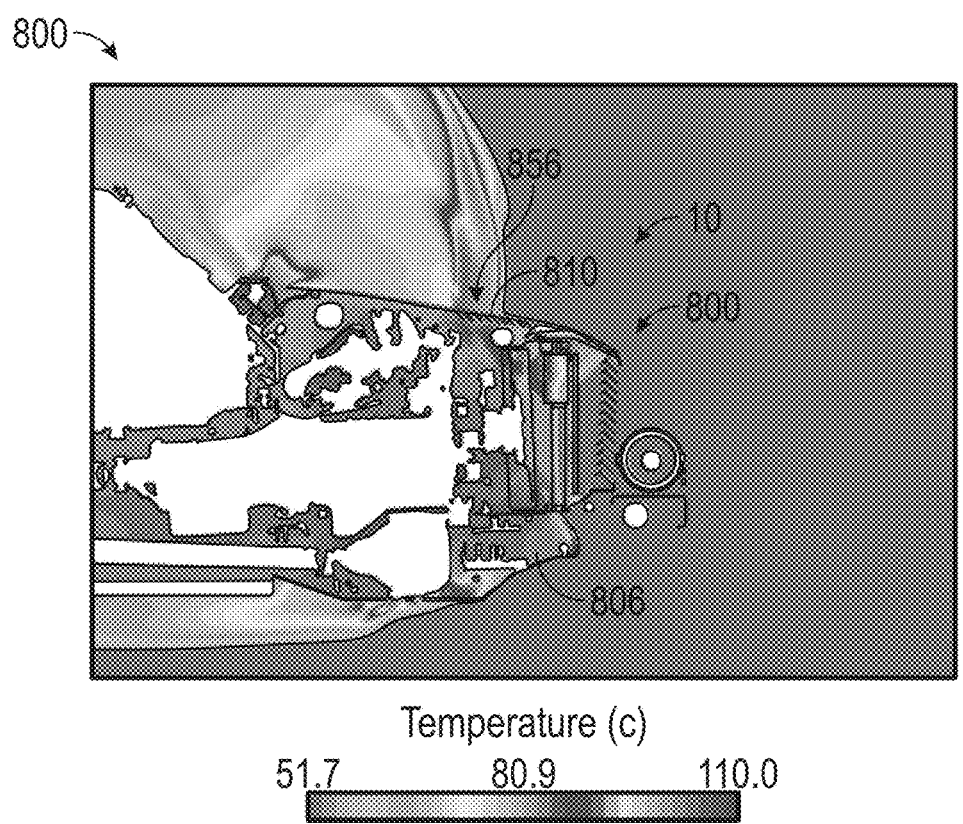
Figure 31:
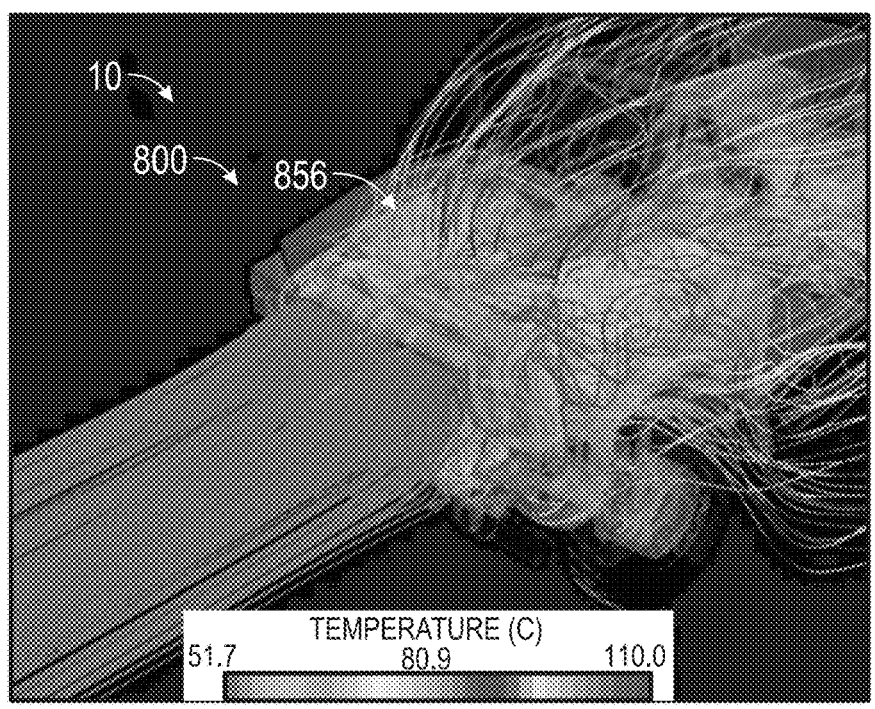
FIGS. 31 and 32 are perspective views of test simulations of the hood assembly of FIG. 15 illustrating heat dissipation and airflow, according to exemplary embodiments.
Figure 32:
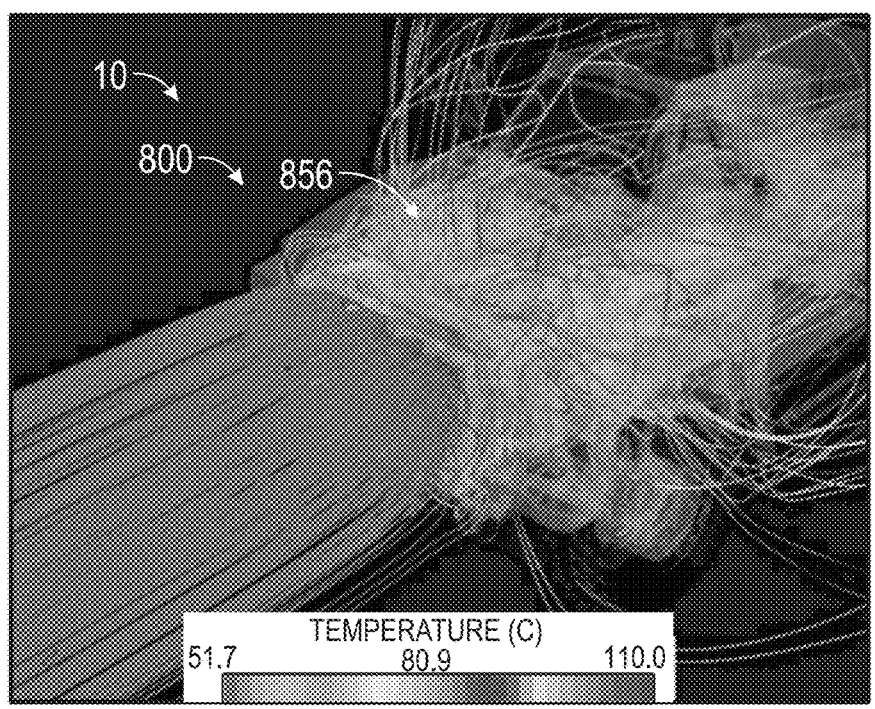
Figure 33:
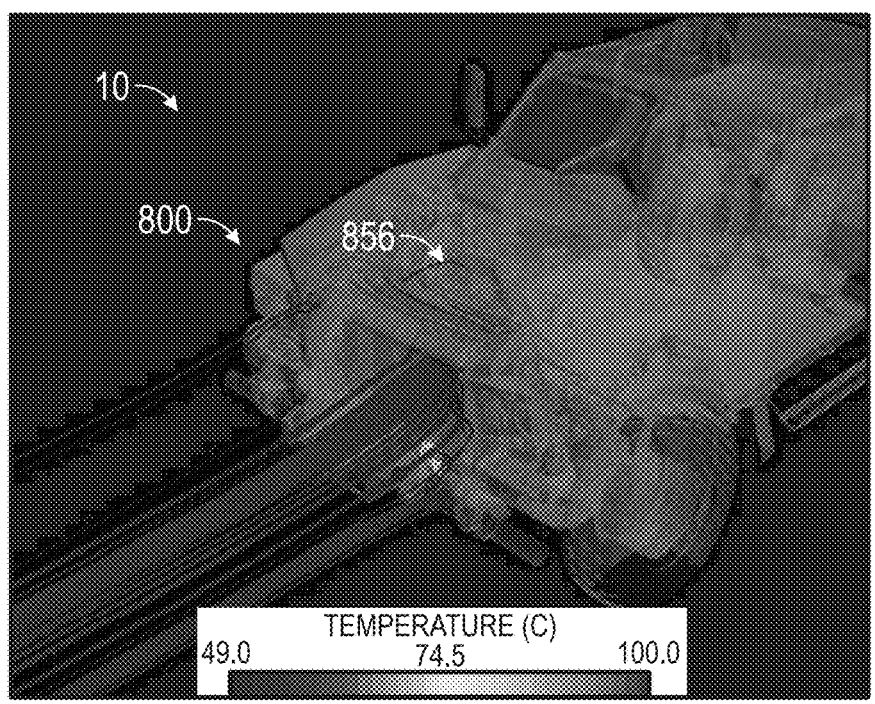
FIGS. 33 and 34 are perspective views of test simulations of the hood assembly of FIG. 15 illustrating heat dissipation and airflow, according to exemplary embodiments.
Figure 34:
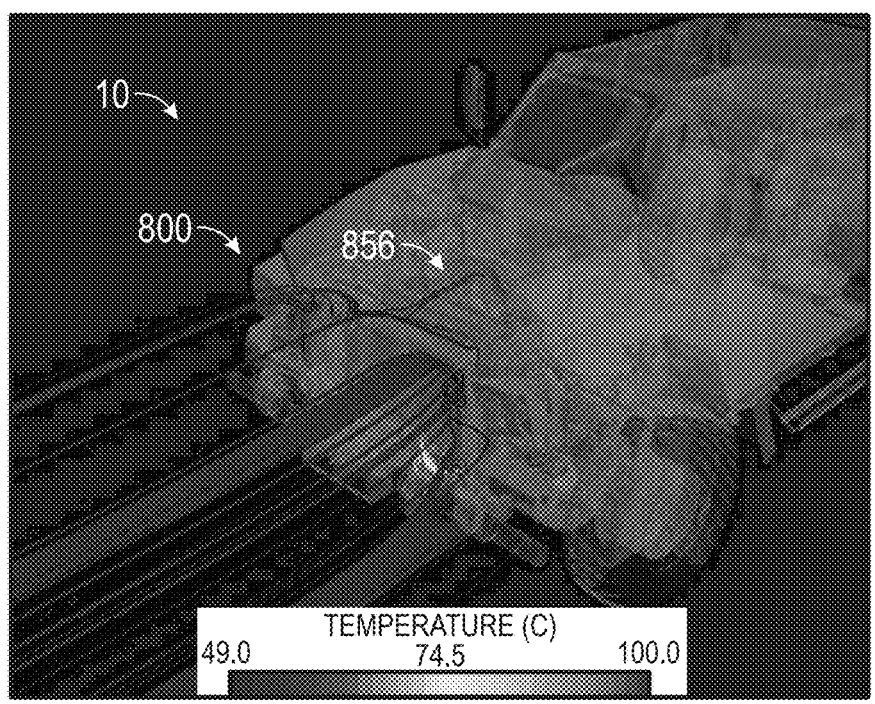

FIGS. 29-30, 31-32, and 33-34 illustrate simulation results of the hood assembly 800 in different conditions. Specifically, FIGS. 29, 31, and 33 illustrate airflow and temperature for a first condition (e.g., a first speed), and FIGS. 30, 32, and 34 illustrate airflow and temperature for a second condition (e.g., a second speed). FIGS. 29-30 show temperature airflow for the hood assembly 800 (e.g., including the baffle 866, the seals, and the foam seal 900), FIGS. 31-32 illustrate streamlines for the hood assembly 800 (e.g., including the baffle 866, the seals, and the foam seal 900), and FIGS. 33-34 illustrate streamlines of heat exchanger (e.g., the radiator 854) recirculation for the hood assembly 800 (e.g., including the baffle 866, the seals, and the foam seal 900). Advantageously, the hood assembly 800 provides improved cooling of the radiator 854 or engine bay by limiting entry of air through the vents 856 due to at least the baffle 866, limiting airflow around the radiator 854 due to at least the seals 872, 874, 876, and 878, and by mitigating recirculation of air at the top of the radiator 854 due to at least the foam seal 900.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the hull and frame assembly 100, the driveline 600, the electric motor 700, the hood 320, the hood 800, etc.) as shown in the various exemplary embodiments is illustrative only. Additionally, any element disclosed in one embodiment may be incorporated or utilized with any other embodiment disclosed herein.

The invention claimed is:

1. A vented hood assembly for a military vehicle, the vented hood assembly comprising:
 a hood defining a hood volume, an inlet to the hood volume, and an outlet from the hood volume, the hood comprising a vent including a plurality of first louvres extending across the outlet, the plurality of first louvres extending in an upwards and rearwards direction towards a cab of the military vehicle;
 a heat exchanger positioned in the hood volume;
 a grille comprising a plurality of second louvres configured to direct air in an upwards direction through the inlet to the hood volume and in a downwards direction through a baffle towards the heat exchanger;
 a plurality of seals extending between sides of support members of the heat exchanger and the hood, the plurality of seals configured to sealingly couple with the sides of the support members of the heat exchanger and corresponding surfaces of the hood; and
 wherein during transportation, air is driven to enter the hood volume through the inlet, pass through the heat exchanger, and exit the hood volume through the outlet to induce convective heat transfer from the heat exchanger into the air.

2. The vented hood assembly of claim 1, wherein the grille defines a plurality of openings between adjacent of the plurality of second louvres as the inlet to the hood volume, the grille positioned in front of the heat exchanger.

3. The vented hood assembly of claim 1, wherein spaces between the plurality of first louvres define the outlet to an exterior of the hood volume.

4. The vented hood assembly of claim 1, further comprising the baffle disposed on the hood at a front of the vent, the baffle extending into the hood volume in a downwards and rearwards direction.

5. The vented hood assembly of claim 4, wherein the baffle is configured to limit entry of air from an exterior to the hood volume through the vent.

6. The vented hood assembly of claim 1, further comprising a foam seal positioned on top of the heat exchanger between the heat exchanger and an interior surface of the hood.

7. The vented hood assembly of claim 6, wherein the foam seal is configured to limit air from recirculating through the heat exchanger.

8. A military vehicle comprising:
 a chassis; and
 a hood assembly comprising:
  a hood defining a hood volume, an inlet to the hood volume, and an outlet from the hood volume, the hood comprising a vent including a plurality of first louvres extending across the outlet, the plurality of first louvres extending in an upwards and rearwards direction towards a cab of the military vehicle;
  a heat exchanger positioned in the hood volume;
  a grille comprising a plurality of second louvres configured to direct air in an upwards direction through the inlet to the hood volume and in a downwards direction through a baffle towards the heat exchanger;
  a plurality of seals extending between sides of support members of the heat exchanger and the hood, the plurality of seals configured to sealingly couple with the sides of the support members of the heat exchanger and corresponding surfaces of the hood; and
  wherein during transportation, air is driven to enter the hood volume through the inlet, pass through the heat exchanger, and exit the hood volume through the outlet to induce convective heat transfer from the heat exchanger into the air.

9. The military vehicle of claim 8, wherein the grille defines a plurality of openings between adjacent of the plurality of second louvres as the inlet to the hood volume, the grille and is positioned in front of the heat exchanger.

10. The military vehicle of claim 8, wherein spaces between the plurality of first louvres define the outlet to an exterior of the hood volume.

11. The military vehicle of claim 8, wherein the hood assembly further comprises a baffle disposed on the hood at a front of the vent, the baffle extending into the hood volume in a downwards and rearwards direction.

12. The military vehicle of claim 11, wherein the baffle is configured to limit entry of air from an exterior to the hood volume through the vent.

13. The military vehicle of claim 8, wherein the hood assembly further comprises a foam seal positioned on top of the heat exchanger between the heat exchanger and an interior surface of the hood.

14. The military vehicle of claim 13, wherein the foam seal is configured to limit air from recirculating through the heat exchanger.

15. The military vehicle of claim 8, wherein, as the military vehicle transports in a forwards direction, the hood assembly is configured to receive air from in front of the military vehicle through the inlet, and direct air through the outlet in a partially upwards direction.

16. A hood assembly for a vehicle comprising:
   a hood defining a hood volume;
   a vent disposed on a top of the hood, the vent defining an outlet of the hood volume to an exterior of the hood assembly, the hood comprising a vent including a plurality of first louvres extending across the outlet, the plurality of first louvres extending in an upwards and rearwards direction towards a cab of the vehicle;
   a heat exchanger positioned in the hood volume;
   a grille comprising a plurality of second louvres configured to direct air in an upwards direction through an inlet to the hood volume and in a downwards direction through a baffle to the heat exchanger, the plurality of second louvres defining a plurality of openings between adjacent of the plurality of second louvres, the plurality of openings defining the inlet to the hood volume from an exterior of the hood assembly, the grille positioned in front of the heat exchanger,
   the baffle disposed on the hood at a front of the vent, the baffle extending into the hood volume in a downwards and rearwards direction;
   a plurality of seals extending between sides of support members of the heat exchanger and the hood, the plurality of seals configured to sealingly couple with the sides of the support members of the heat exchanger and corresponding surfaces of the hood; and
   a foam seal positioned on top of the heat exchanger between the heat exchanger and an interior surface of the hood.

17. The hood assembly of claim 16, wherein during transportation, air is driven to enter the hood volume through the grille, pass through the heat exchanger, and exit the hood volume through the vent to induce convective heat transfer from the heat exchanger into the air.

18. The hood assembly of claim 17, wherein the baffle is configured to limit entry of air from the exterior to the hood volume through the vent.

19. The hood assembly of claim 18, wherein the plurality of seals are configured to limit air from passing around the heat exchanger.

20. The hood assembly of claim 18, wherein the foam seal is configured to limit air from recirculating through the heat exchanger.

* * * * *